US011777786B2

(12) United States Patent
Elsakhawy et al.

(10) Patent No.: US 11,777,786 B2
(45) Date of Patent: Oct. 3, 2023

(54) METHOD, DEVICE AND COMPUTER PROGRAM PRODUCT FOR ANOMALY DETECTION AND ROOT CAUSE ANALYSIS

(71) Applicant: RAKUTEN MOBILE, INC., Tokyo (JP)

(72) Inventors: Mahmoud Elsakhawy, Tokyo (JP); Manoj Kumar, Tokyo (JP); Ahmed Elagamy, Tokyo (JP); Harimohan Sharma, Tokyo (JP); Vishal Gala, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/510,301

(22) Filed: Oct. 25, 2021

(65) Prior Publication Data
US 2023/0126260 A1 Apr. 27, 2023

(51) Int. Cl.
*H04L 12/24* (2006.01)
*H04L 41/0631* (2022.01)
*H04L 41/5009* (2022.01)

(52) U.S. Cl.
CPC ...... *H04L 41/0631* (2013.01); *H04L 41/5009* (2013.01)

(58) Field of Classification Search
CPC . H04L 41/0631; H04L 41/5009; H04L 41/40; H04L 43/06; H04L 43/08; H04L 41/16; H04L 43/16; H04W 24/02
See application file for complete search history.

(56) References Cited

U.S. PATENT DOCUMENTS

| 11,212,195 | B1* | 12/2021 | Tamir | G06F 9/5072 |
|---|---|---|---|---|
| 11,366,842 | B1* | 6/2022 | Swaminathan | G06F 17/18 |
| 11,522,769 | B1* | 12/2022 | Choudhary | G06F 16/284 |
| 11,582,255 | B2* | 2/2023 | Kels | H04L 63/1425 |
| 2013/0198119 | A1* | 8/2013 | Eberhardt, III | G06N 20/00 706/12 |
| 2017/0272960 | A1* | 9/2017 | Li | H04W 24/02 |
| 2018/0234443 | A1 | 8/2018 | Wolkov et al. | |
| 2018/0270126 | A1* | 9/2018 | Tapia | H04L 43/08 |
| 2019/0102213 | A1* | 4/2019 | Yousaf | H04L 43/20 |
| 2019/0377625 | A1 | 12/2019 | Chintalapati et al. | |
| 2020/0053108 | A1 | 2/2020 | Cili et al. | |

(Continued)

OTHER PUBLICATIONS

Adinarayana et al., "Time Series Anomaly Detection Using Enhanced Spectral Residual Approach", KDD'20,, Aug. 22-27, 2020, San Diego CA, USA, 4pp.

*Primary Examiner* — Schquita D Goodwin
(74) *Attorney, Agent, or Firm* — HAUPTMAN HAM, LLP

(57) ABSTRACT

A method includes, for each feature, performing an anomaly detection process. The anomaly detection process includes selecting, from a plurality of historical data points of the feature, a set of historical data points. Using a machine learning module, a set of scores, each corresponding to one historical data point, is selected. An anomaly threshold is determined based on the set of scores, and compared with a score corresponding to a current data point of the feature to determine whether the current data point is anomalous or not. When the current data point is anomalous, the anomaly detection process includes identifying the feature as an anomalous feature, and including the anomalous feature and the current data point in an anomaly detection report.

20 Claims, 11 Drawing Sheets

(56) References Cited

U.S. PATENT DOCUMENTS

| | | | |
|---|---|---|---|
| 2020/0084087 A1* | 3/2020 | Sharma | H04W 24/04 |
| 2020/0250559 A1* | 8/2020 | Dinh | H04L 41/147 |
| 2020/0364607 A1* | 11/2020 | BahenaTapia | G06N 7/01 |
| 2021/0049143 A1* | 2/2021 | Jacinto | G06F 16/909 |
| 2021/0058306 A1* | 2/2021 | Szigeti | H04L 41/0686 |
| 2021/0126839 A1* | 4/2021 | Rudrachar | H04L 43/045 |
| 2021/0135964 A1* | 5/2021 | Faiczak | H04L 43/0817 |
| 2021/0152415 A1* | 5/2021 | Embarmannar Vijayan | H04L 41/0631 |
| 2021/0203576 A1* | 7/2021 | Padfield | H04L 43/04 |
| 2021/0281492 A1* | 9/2021 | Di Pietro | G06N 5/022 |
| 2021/0383248 A1* | 12/2021 | Schimpfky | G06F 17/18 |
| 2022/0003679 A1* | 1/2022 | Brullot | G16C 60/00 |
| 2022/0014532 A1* | 1/2022 | Perez-Ramirez | H04L 63/1425 |
| 2022/0038332 A1* | 2/2022 | Umakanth | H04L 41/5016 |
| 2022/0255810 A1* | 8/2022 | Tomkins | H04L 41/065 |
| 2023/0111216 A1* | 4/2023 | Niyazov | G06Q 10/06375 705/7.37 |

* cited by examiner

| | | | Report A | | | | Report B | | | | Report C | |
|---|---|---|---|---|---|---|---|---|---|---|---|---|
| timestamp | POD Name | Node | KPI | KPI Value | KPI Ref Value | RCA-1 | RCA-1 Value | RCA-2 | RCA-2 Value | RCA-3 | RCA-3 Value | VMs | VM-KPI Values |
| 2021-05-30 03:00:00 | TOTSUKA POD2 | RCS_Core | 11202-IMC_BREAKO UT_CSSR | 87.47 | 96.69 | 11516-C10A802_CSVPG_SCSCF_SI P_RCV_INV_403 | 14 | 11570-C10A802_CSVPG_SCS CF_SIP_RCV_INV_504 | 7 | - | - | uhn3ttr2rcsc0101,uhn3ttr2rc sc0102,uhn3ttr2rcsc0104 | 72.46,89.1 9,93.24 |
| 2021-05-30 02:00:00 | TOTSUKA POD2 | RCS_Core | 11202-IMC_BREAKO UT_CSSR | 88.09 | 96.35 | 11516-C10A802_CSVPG_SCSCF_SI P_RCV_INV_403 | 32 | - | - | - | - | uhn3ttr2rcsc0101,uhn3ttr2rc sc0105,uhn3ttr2rcsc0104 | 65.57,97.1 2,97.2 |
| 2021-05-30 01:00:00 | TOTSUKA POD2 | RCS_Core | 11202-IMC_BREAKO UT_CSSR | 90.72 | 96.16 | 11516-C10A802_CSVPG_SCSCF_SI P_RCV_INV_403 | 30 | 11570-C10A802_CSVPG_SCS CF_SIP_RCV_INV_504 | 10 | - | - | uhn3ttr2rcsc0101,uhn3ttr2rc sc0103,uhn3ttr2rcsc0102 | 72.65,94.0 4,96.34 |
| 2021-05-30 04:00:00 | SANDA POD1 | RCS_Core | 5313-IMC_REGISTR ATION_SR | 98.3 | 99.98 | 24821-CSRPG_SCSCF_SIP_SND_RE G_500 | 42 | - | - | - | - | uhn1snr1rcsc0104 | 91.2 |
| 2021-05-30 03:00:00 | TOTSUKA POD1 | RCS_Voice | 6811-TAS_MO_CSS R_LTE | 93.79 | 98.86 | 6859-TAS_CALLSETUP_ORIG_CAL L_RESP_503 | 29 | - | - | - | - | uhn3ttr1rvsc0103,uhn3ttr1rv sc0101 | 85.0,95.86 |
| 2021-05-30 03:00:00 | TOTSUKA POD1 | RCS_Voice | 10020-RCS VOICE CSSR | 97.46 | 99.22 | 6859-TAS_CALLSETUP_ORIG_CAL L_RESP_503 | 29 | - | - | - | - | uhn3ttr1rvsc0103,uhn3ttr1rv sc0101 | 92.77,97.9 1 |
| 2021-05-30 04:00:00 | SANDA POD1 | RCS_Voice | 7149-TAS_MT_CSS R_WIFI | 98.67 | 100 | 7191-TAS_CALLSETUP_TERM_CA LL_RESP_500 | 3 | - | - | - | - | uhn3snr1rvsc0101 | 95.08 |
| 2021-05-30 02:00:00 | SANDA POD1 | RCS_Voice | 7149-TAS_MT_CSS R_WIFI | 98.99 | 99.98 | 7191-TAS_CALLSETUP_TERM_CA LL_RESP_500 | 3 | - | - | - | - | uhn3snr1rvsc0103 | 95.65 |

FIG. 7

METHOD, DEVICE AND COMPUTER PROGRAM PRODUCT FOR ANOMALY DETECTION AND ROOT CAUSE ANALYSIS

BACKGROUND

Cellular network service providers strive to provide highly reliable, good quality and efficient network connectivity in cellular service through their wireless communications networks (e.g., cellular networks). However, anomalies in a radio access network and/or in a core network of a wireless communications network, and/or in one or more programs executed in or by such networks, result in service failures or degradations in connectivity. Detection of anomalies and understanding the causes, or probable causes, of anomalies are considerations for service providers to prevent or reduce the negative impact of anomalies and/or subsequent outage events.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features be arbitrarily increased or reduced for clarity of discussion.

FIG. 7 is a table showing an example anomaly detection report, in accordance with some embodiments.

DETAILED DESCRIPTION

Figure 1:
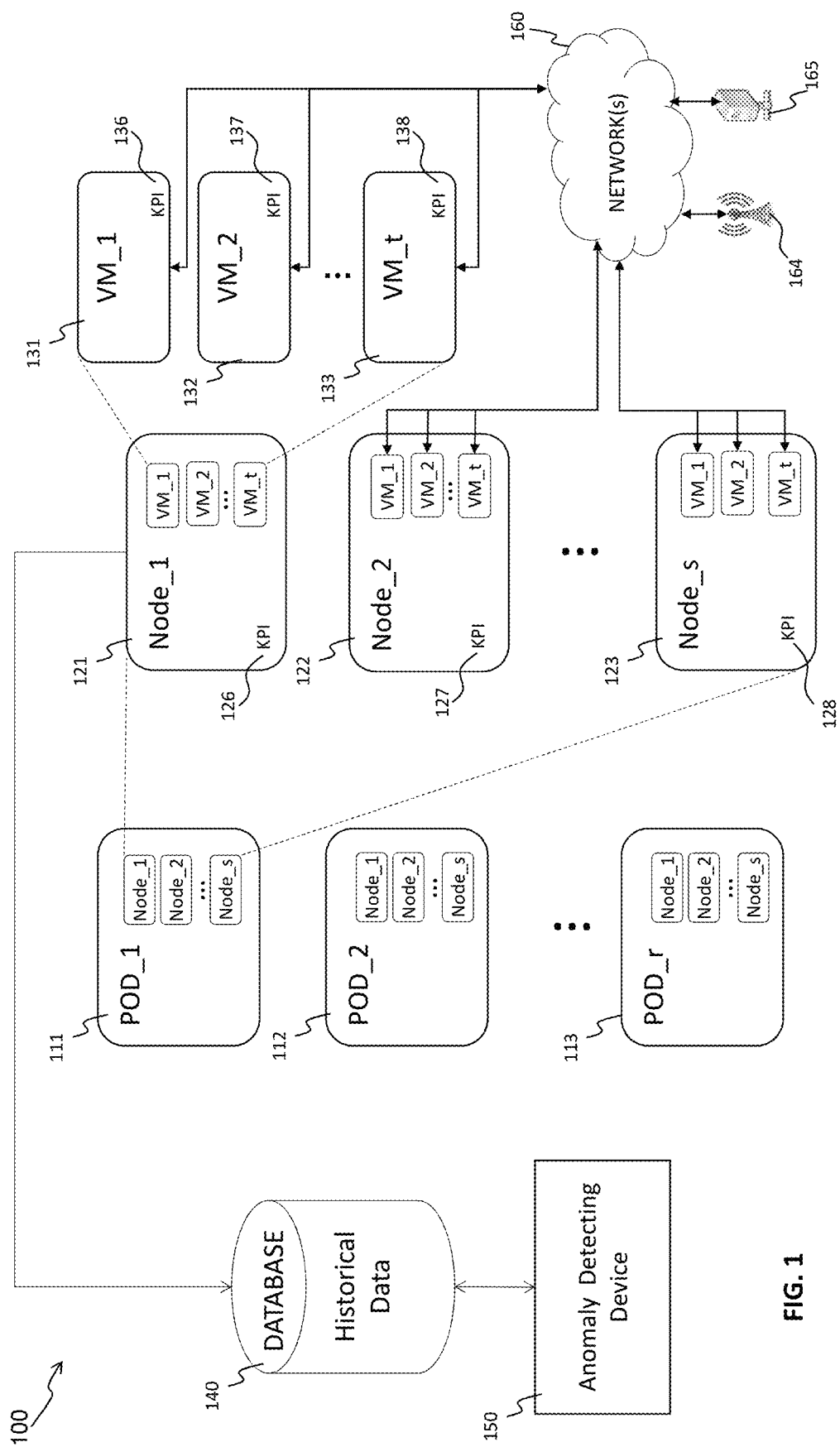
FIG. 1 is a schematic diagram of a cellular network, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, be used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors used herein likewise be interpreted accordingly.

Some embodiments provide a system, method or device for network anomaly detection, using machine learning (ML) to detect anomaly events at various levels in a cellular network. In at least one embodiment, one or more key performance indicators (KPIs) in the cellular network are loaded into a machine learning module to determine anomalous KPIs. In at least one embodiment, probable root causes (also referred to as root cause analysis or RCA) and/or VMs responsible for, or corresponding to, the anomalous KPIs are determined. In some embodiments, the probable RCAs are determined based on Session Initiation Protocol (SIP) release causes (RCs). Information about the anomalous KPIs and the corresponding probable RCAs and/or VMs is automatically detected and included in an anomaly detection report. The information about the probable RCAs and/or VMs in the anomaly detection report are usable to optimize and/or improve the network performance. In some embodiments, based on the anomaly detection report, one or more trouble tickets (TTs) are automatically raised to the concerned teams of domain experts and/or network engineers. Compared to other approaches where an enormous amount of technical reports and/or data from numerous cells or sites all over the cellular network is reviewed by human operators, the anomaly detection technique in accordance with some embodiments saves time and efforts, while ensuring effective network management, optimized network performance and/or timely handling of potential network anomalies. Other configurations and/or effects are within the scopes of various embodiments.

FIG. 1 is a schematic diagram of a cellular network 100, in accordance with some embodiments.

The cellular network 100 comprises a plurality of sections (also referred to herein as pods) 111, 112, 113. In some embodiments, each of the pods 111, 112, 113 corresponds to a different geographical region of a service area of the cellular network 100. Each of the pods 111, 112, 113 comprises a plurality of nodes. For simplicity, nodes 121, 122, 123 of the pod 111 are illustrated in detail in FIG. 1, whereas nodes of the other pods 112, 113 are not illustrated in detail. Descriptions herein with respect to the pod 111 and the nodes 121, 122, 123 are applicable to the other pods 112, 113 and the corresponding nodes of the pods 112, 113. Each of the nodes comprises one or more VMs being executed by or at the node. For simplicity, VMs 131, 132, 133 of the node 121 are illustrated in detail in FIG. 1, whereas VMs of the other nodes 122, 123 are not illustrated in detail. The cellular network 100 further comprises a database 140 and an anomaly detecting device 150. In at least one embodiment, the database 140 is incorporated in the anomaly detecting device 150.

Examples of the cellular network 100 include, but are not limited to, a long term evolution (LTE) network, a fifth generation (5G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, or the like.

The cellular network 100 comprises hardware equipment, for example, one or more base stations and/or one or more network devices. Example configurations of base stations or cells include cell towers each having one or more cellular antennas. In an example, a cell tower includes a radio mast, or another raised structure to create or service a corresponding cell in the cellular network 100. The raised structure supports one or more cellular antennas of the base station. The base station further comprises one or more sets of transmitter/receivers transceivers, digital signal processors, control electronics, a Global Positioning System (GPS) receiver for timing (e.g., for CDMA2000/IS-95 or GSM systems), primary and backup electrical power sources, and sheltering. Cell towers are also referred to as base transceiver stations, mobile phone masts, or the like. Base station configurations other than cell towers are within the scopes of various embodiments. For example, in one or more embodiments, a base station is a cellular-enabled mobile device that is deployable at an arbitrary geographical location, and that is movable to another arbitrary geographical location as needed. In some embodiments, a cell tower or a cellular-enabled mobile device, where one or more cellular antennas and electronic communications equipment are arranged, is referred to as a cellular site. An example hardware configuration of a base station includes at least one computer system described with respect to FIG. 8, with the addition of one or more cellular antennas and corresponding cellular transceiving circuitry. In one or more embodiments, base stations provide cellular communication services to mobile terminals using communication resources. Examples of communication resources include, but are not limited to, a portion of the radio frequency (RF) spectrum, time, code, direction (space), or the like, depending, for example, on the communication access technology employed at the base stations. Examples of communication access technologies include, but are not limited to, frequency division multiple access (FDMA), time division multiple access (TDMA), code division multiple access (CDMA), orthogonal frequency division multiple access (OFDMA), and spatial division multiple access (SDMA), or the like.

Example configurations of network devices include various devices of a core network of the cellular network 100. The core network is coupled to and configured to operate with the base stations, which constitute a radio access network of the cellular network 100, to provide mobile terminals in the cellular network 100 with various cellular communication services. Example components, or network devices, of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The network devices are coupled with each other and/or with the base stations by one or more public and/or proprietary networks. An example hardware configuration of a network device includes at least one computer system described with respect to FIG. 8.

Examples of mobile terminals, which are coupled to and receive cellular communication services provided by or through the cellular network 100, include, but are not limited to, cell phones, tablets, media players, gaming consoles, personal data assistants (PDAs), laptops, and other electronic devices configured to transmit and/or receive cellular communication to/from the base stations of the cellular network 100. An example hardware configuration of a mobile terminal includes at least one computer system described with respect to FIG. 8, with the addition of one or more cellular antennas and corresponding cellular transceiving circuitry. Examples of communication technologies for performing cellular communication include, but are not limited to, 2G, 3G, 4G, 5G, GSM, EDGE, WCDMA, HSPA, CDMA, LTE, DECT and WiMAX. Examples of services provided over cellular communication, herein referred to as cellular communication services, include, but are not limited to, voice calls, data, emails, messages such as SMS and MMS, applications, and control signals.

In FIG. 1, the cellular network 100 comprises r pods, where r is any natural number. In some embodiments, r=4. The pod 111 comprises s nodes, where s is any natural number. In some embodiments, different pods in the cellular network 100 have different numbers and/or types of nods. In at least one embodiment, two or more pods in the cellular network 100 have the same number and/or types of nodes. In the example configuration of FIG. 1, each of the pods 111, 112, 113 has the same nodes Node_1, Node_2, . . . Node_r. Each node, e.g., node 121, 122, or 123 comprises hardware equipment, for example, one or more computer systems described with respect to FIG. 8. In some embodiments, each of the nodes 121, 122, 123 is configured to perform a separate operation or function from the other node in the same pod 111.

In FIG. 1, the node 121 comprises t VMs, where t is any natural number. In some embodiments, different nodes in the same pod have different numbers and/or types of VMs. In at least one embodiment, two or more nodes in the same pod have the same number and/or types of VMs. VMs are programs or software modules which, when executed, handle various data and/or signal processing to perform one or more functions and/or operations of the corresponding node. In at least one embodiment, VMs are executed on or by computer hardware, such as at least one computer system described with respect to FIG. 8. In some embodiments, the computer hardware, on which one or more VMs of a node are executed, comprises computer hardware of the node. In at least one embodiment, the computer hardware, on which one or more VMs of a node are executed, comprises computer hardware outside the node, e.g., cloud computer hardware. Other configurations are within the scopes of various embodiments.

The VMs communicate and/or exchange data with various other components, e.g., one or more base stations 164 and/or one or more network devices 165 of the cellular network 100 through one or more network(s) 160, as schematically indicated in FIG. 100. In some embodiments, the network(s) 160 include(s) a proprietary network and/or a public network (such as the Internet). In some embodiments, the VMs control and/or manage operations of other components of the cellular network 100, e.g., one or more base stations 164 and/or one or more network devices 165, to provide cellular communication services to mobile terminals of end users. In some embodiments, the cellular network 100 is a virtual network in which the VMs are executed on computer hardware to perform various Virtual Network Functions (VNFs) including, but not limited to, Domain Name Server (DNS), signaling, security such as virus scanners and firewalls, billing, switching, traffic analysis, quality of service, load balancing, content delivery, or the like.

As a result of technology advancements and proliferation of mobile devices, cellular networks such as the cellular network 100 become more and more complex. In a complex cellular network, automatic anomaly detection is a consideration with an increasing importance for effective operation and management of the cellular network. A reason is that if an anomaly event is not addressed in a timely manner, service deterioration and/or outage may occur with further undesirable consequences.

An anomaly occurs at a pod, a node or a VM when a parameter or a behavior of the pod, node or VM's operation or performance does not conform to an expected or predetermined normal operation or performance. In some embodiments, an anomaly event does not necessarily cause immediate malfunction or fail in hardware and/or operation. For an event to be considered anomalous, it is sufficient, in one or more embodiments, that the pod, node or VM where the event occurs or is observed does not perform or operate as intended, or that the pod, node or VM performs differently from other, similar pods, nodes or VMs. For example, when an event is detected that a pod, node or VM performs, operates or functions in manner inconsistent with a trend leading up to the event, the event is considered an anomaly.

Due to the increasing complexity of cellular networks, the amount of data or technical reports collected from various pods, nodes, VMs, cells, base stations, network devices in cellular networks, even for a short period of time, e.g., one day, becomes enormous and makes it extremely time-consuming, impractical, or even impossible for domain experts or engineers to perform a manual analysis to identify an anomaly event and/or to identify a root cause of the anomaly. For example, it may take a week or even a month for a domain or network engineer to review data collected from a cell or node to determine whether the cell or node is anomalous. To address these and other issues, some embodiments use machine learning to detect anomaly events in a cellular network. In the cellular network 100, data to be used for machine learning are collected in the database 140, whereas machine learning is performed by the anomaly detecting device 150 to detect anomalies. As described herein, in at least one embodiment, the machine learning device 140 is incorporated in the anomaly detecting device 150.

The database 140 is coupled, e.g., via a network (not shown), to the nodes 121, 122, 123, to receive and store various data related to performance and/or operations of the nodes and/or corresponding VMs. In some embodiments, the network via which the database 140 is coupled to receive data comprises a section of the Internet. In at least one embodiment, the database 140 comprises one or more non-transitory, computer-readable storage media, as described herein. In at least one embodiment, the database 140 is hosted by one or more computer systems, such as one or more computer systems as described with respect to FIG. 8.

The anomaly detecting device 150 is coupled to the database 140 to receive data for machine learning and anomaly detection. The anomaly detecting device 150 is configured to, based on results of machine learning and anomaly detection, generate an anomaly detection report, as described herein. In at least one embodiment, the anomaly detecting device 150 is further configured to automatically generate trouble tickets based on the anomaly detection report. In one or more embodiments, the results of anomaly detection and/or the anomaly detection report are saved in the database 140. An example hardware configuration of the anomaly detecting device 150 includes at least one computer system described with respect to FIG. 8. Example processes performed by the anomaly detecting device 150 are described with respect to FIGS. 3-6. An example of a report output by the anomaly detecting device 150 is described with respect to FIG. 7.

The data collected from the pods, nodes and/or corresponding VMs for anomaly detection are referred to as metrics for anomaly detection. The metrics for anomaly detection comprise features indicative of the operation or performance of pods, nodes and/or corresponding VMs. Examples of such features include key performance indicators (KPIs). Other features indicative of the operation or performance of pods, nodes and/or corresponding VMs are within the scopes of various embodiments.

In the example configuration in FIG. 1, each of the nodes 121, 122, 123, and VMs 131, 132, 133 comprises various KPIs, data of which are collected in the database 140. For simplicity, a KPI is illustrated for each node and VM, whereas other KPIs for the same node or VM are not illustrated. In some embodiments, the same KPI has different data at different levels in the cellular network 100. For example, the KPI 126 at the node 121 is the same as KPIs 136, 137, 138 at the corresponding VMs 131, 132, 133. Data or values of the KPIs 136, 137, 138 at the corresponding VMs 131, 132, 133 contribute to data or value of the KPI 126 at the node 121. In some embodiments, for one or more or all of the pods 111, 112, 113, the data or values of KPIs at the node-level, e.g., the KPIs 126, 127, 128, are processed by the anomaly detecting device 150 to detect the pod and node with anomalies. In at least one embodiment, the anomaly detecting device 150 further drills down to the VM-level to, based on the data or values of the VM-level KPIs, e.g., the KPIs 136, 137, 138, identify one or more VMs contributing to the detected anomalies. In some embodiments, not all nodes of a pod have the same KPI. In an example, the nodes 121, 122 have the same KPI 126, 127; however, the node 123 does not have the same KPI (i.e., the KPI 128 is different from the KPI 126, 127 in this example). In some embodiments, not all VMs of a node have the same KPI. In an example, the VMs 131, 132 have the same KPI 136, 137; however, the VM 133 does not have the same KPI (i.e., the KPI 138 is different from the KPI 136, 137 in this example). In some embodiments, KPI data of various KPIs of nodes and/or corresponding VMs are reported to the database 140 based on data captured by various sensors and/or circuitry at the corresponding base stations and/or network devices which are communicated with and/or managed/controlled by the nodes and/or corresponding VMs. In at least one embodiment, the KPI data stored in the database 140 for anomaly detection are core KPIs collected from one or more of core domains including, but not limited to, Evolved Packet Core (EPC), IP Multimedia Subsystem (IMS), Rich Communication Services (RCS), or the like.

Figure 2:
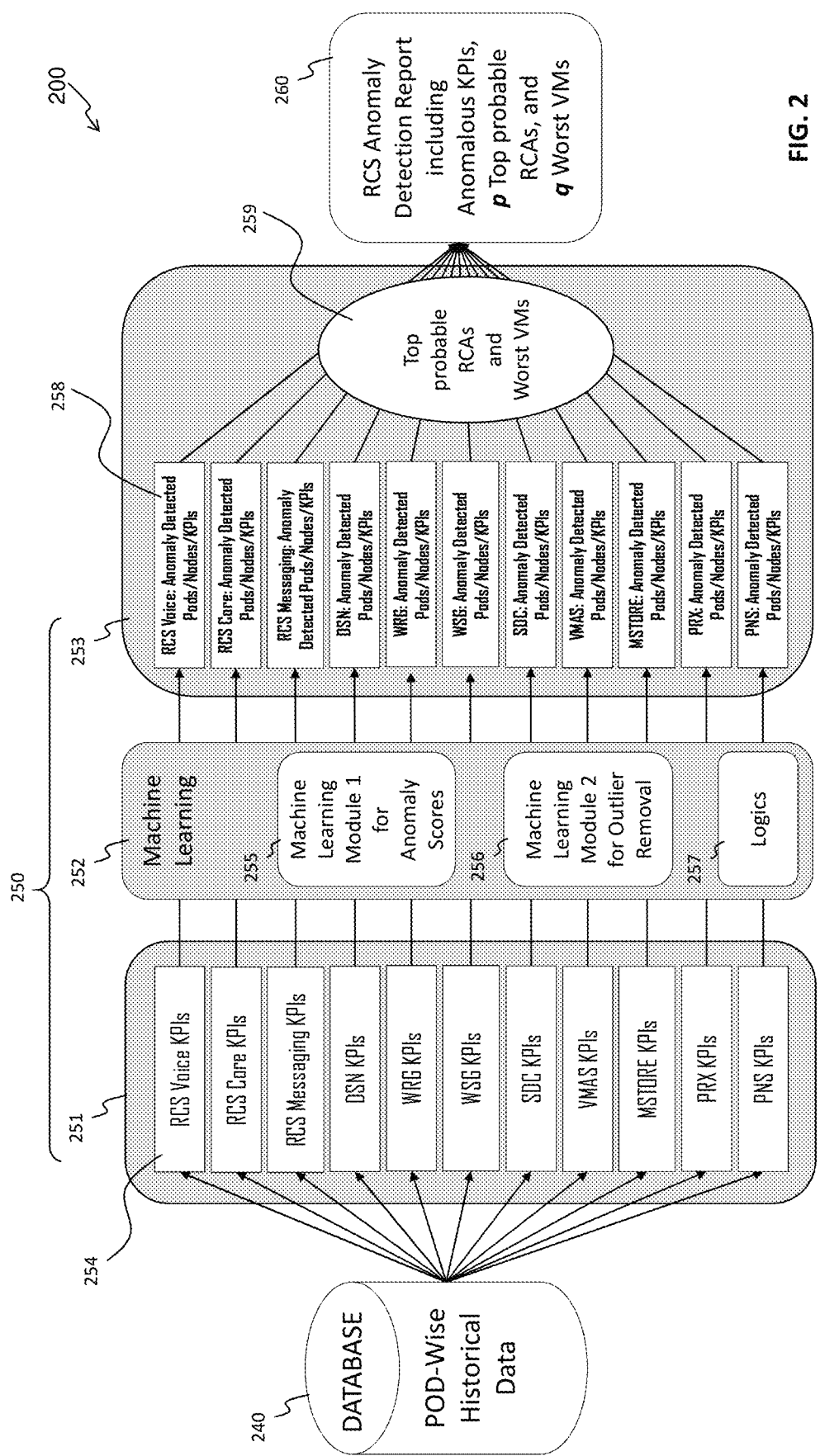
FIG. 2 is a schematic diagram of an anomaly detecting system, in accordance with some embodiments.

FIG. 2 is a schematic diagram of an anomaly detecting system 200, in accordance with some embodiments. In some embodiments, the anomaly detecting system 200 is part of, or configured to perform anomaly detection for, the cellular network 100. The anomaly detecting system 200 comprises a database 240 and an anomaly detecting device 250. In at least one embodiment, the database 240 corresponds to the database 140 and/or the anomaly detecting device 250 corresponds to the anomaly detecting device 150. In some embodiments, the database 240 is incorporated in the anomaly detecting device 250.

The database 240 is configured to store historical data collected from at least one pod in a communications network, such as the cellular network 100. In some embodiments, the historical data are collected from all pods, such as pods 111, 112, 113, of the communications network and are stored in the database 240. In some embodiments, the collected historical data are KPI data, as described herein.

The anomaly detecting device 250 comprises a plurality of modules 251, 252, 253 configured to receive and/or select data from the database 240, perform anomaly detection based on the received and/or selected data, and output anomaly detection results in the form of an anomaly detection report 260. In some embodiments, at least one of the modules 251, 252, 253 is executed by a hardware processor as described herein.

The module 251 is a data selection module configured to select a specific data set for anomaly detection, as described herein. In the example configuration in FIG. 2, the data received by the data selection module 251 comprise KPI data of various KPIs from various nodes in each pod. In example embodiments described in detail herein with respect to FIG. 2, anomaly detection and/or RCA is/are performed based on KPI data collected from nodes in the RCS (Rich Communication Services) domain of a core network. However, some embodiments are applicable to perform anomaly detection and/or RCA based on KPI data collected from nodes in other domains of the core network, including, but not limited to, Evolved Packet Core (EPC), IP Multimedia Subsystem (IMS), or the like. Further, some embodiments are applicable to perform anomaly detection and/or RCA based on KPI data collected from one or more domains of another network, such as, a Radio Access Network, or the like.

In the example configuration in FIG. 2, the nodes from which KPI data are collected include RCS (Rich Communication Services) Voice (or RCS Application Server), RCS Core, RCS Messaging, DSN (Domain Selector Node), WRG (Web Real-Time Communication Gateway), WSG (Web Service Gateway), SDC (Smart Device Connect), VMAS (Voice Mail Server), MSTORE (Common Message Store), PRX (Presence Server), PNS (Push Notification Server), CRDL (CloudRange Data Layer), DNS (Domain Name Server). For simplicity, the nodes CRDL and DNS are not illustrated in FIG. 2. In some embodiments, each pod includes all of the nodes RCS Voice, RCS Core, RCS Messaging, DSN, WRG, WSG, SDC, VMAS, MSTORE, PRX, PNS, CRDL, DNS. In at least one embodiment, one or more of the nodes RCS Voice, RCS Core, RCS Messaging, DSN, WRG, WSG, SDC, VMAS, MSTORE, PRX, PNS, CRDL, DNS is/are omitted from one or more pods of the communications network. Each node has a set of KPIs characterizing performance and/or operation states of the node. For example, KPIs of the node RCS Voice are indicated as RCS Voice KPIs, KPIs of the node RCS Core are indicated as RCS Core KPIs, or the like. In some embodiments, at least one KPI is unique for the corresponding node, and is not included in the other nodes. For example, at least one RCS Voice KPI is unique for the node RCS Voice, and is not included in the KPIs of the other nodes. In at least one embodiment, two of more of the nodes have the same KPI. In some embodiments, to distinguish a KPI of a pod or node from the same KPI but of another pod or node, each KPI is identified by the pod and node to which the KPI belongs. For example, each KPI is assigned a unique KPI identification (ID) which includes the name of the KPI and the names of the corresponding pod and node. In at least one embodiment, the data selection module 251 is configured to select, for each KPI per node per pod, a specific set of data for use in anomaly detection. In an example, each of the pods (e.g., a total of four pods) has its own RCS Voice node, all four RCS Voice nodes of all four pods have the same set of RCS Voice KPIs, and data of the RCS Voice KPIs of all four RCS Voice nodes of all four pods are selected and collected, by the data selection module 251, into a KPI data set 254. A more detailed example of such a set of data is described with respect to FIGS. 4A and/or 4B.

The module 252 is a machine learning module configured to, based on a specific set of data of a KPI provided from the data selection module 251, perform machine learning to detect whether the KPI is anomalous or not. In the example configuration in FIG. 2, the machine learning module 252 comprises a first machine learning module 255 for anomaly scores, a second machine learning module 256 for outlier removal, and one or more logics 257. In at least one embodiment, the first machine learning module 255 and/or second machine learning module 256 comprises a unsupervised machine learning module. In one or more embodiments, the first machine learning module 255 and/or second machine learning module 256 comprises one or more neural networks. A neural network, or artificial neural network (ANN), includes one or more computing platforms performing machine learning to solve problems in a manner similar to a biological brain, e.g., a human brain. To do so, the neural network includes a plurality of nodes, or artificial neurons, connected together to simulate neurons in a biological brain. In an example, a node comprises one or more programmable memory cells or controllably variable resistors. Nodes of a neural network are arranged in layers. A signal travels from an input layer through multiple layers of the neural network to an output layer. As the signal travels through the neural network, the signal is modified by weights of the nodes and/or weights of connections among the nodes. The weights are adjusted as learning or training proceeds in the neural network. A trained neural network corresponds to a trained machine learning model, in at least one embodiment. In some embodiments, the second machine learning module 256 is omitted. Example operations performed by the machine learning module 252 are described with respect to FIGS. 4A-4C.

The module 253 is an RCA and VM report module configured to, based on the anomaly detection results output by the machine learning module 252, identify probable RCAs and VMs corresponding to the detected anomalies, and generate and output the anomaly detection report 260. The anomaly detection results output by the machine learning module 252 and input into the RCA and VM report module 253 comprise a list of all anomalous KPIs detected by the machine learning module 252. For example, based on the data of the RCS Voice KPIs 254 input from the data selection module 251, the machine learning module 252 outputs a list 258 of any one or more anomalous RCS Voice KPIs into the RCA and VM report module 253. For each anomalous KPI in the list 258, the RCA and VM report module 253 is configured to identify, as schematically indicated at 259, one or more probable RCAs and/or one or more corresponding VMs that are most likely to be the reasons the KPI is detected as anomalous. For example, for each anomalous KPI, the RCA and VM report module 253 is configured to identify up to p top probable RCAs and/or up to q worst VMs, where each of p and q is any natural number. In some embodiments, p=q=3. Other values of p and/or q are within the scopes of various embodiments. The RCA and VM report module 253 is configured to include the identified anomalous KPI together with the corresponding one or more probable RCAs and/or one or more VMs in the anomaly detection report 260. Example operations performed by the RCA and VM report module 253 are described with respect to FIGS. 5A, 5B and 6. An example of the anomaly detection report 260 is described with respect to FIG. 7.

Figure 3:
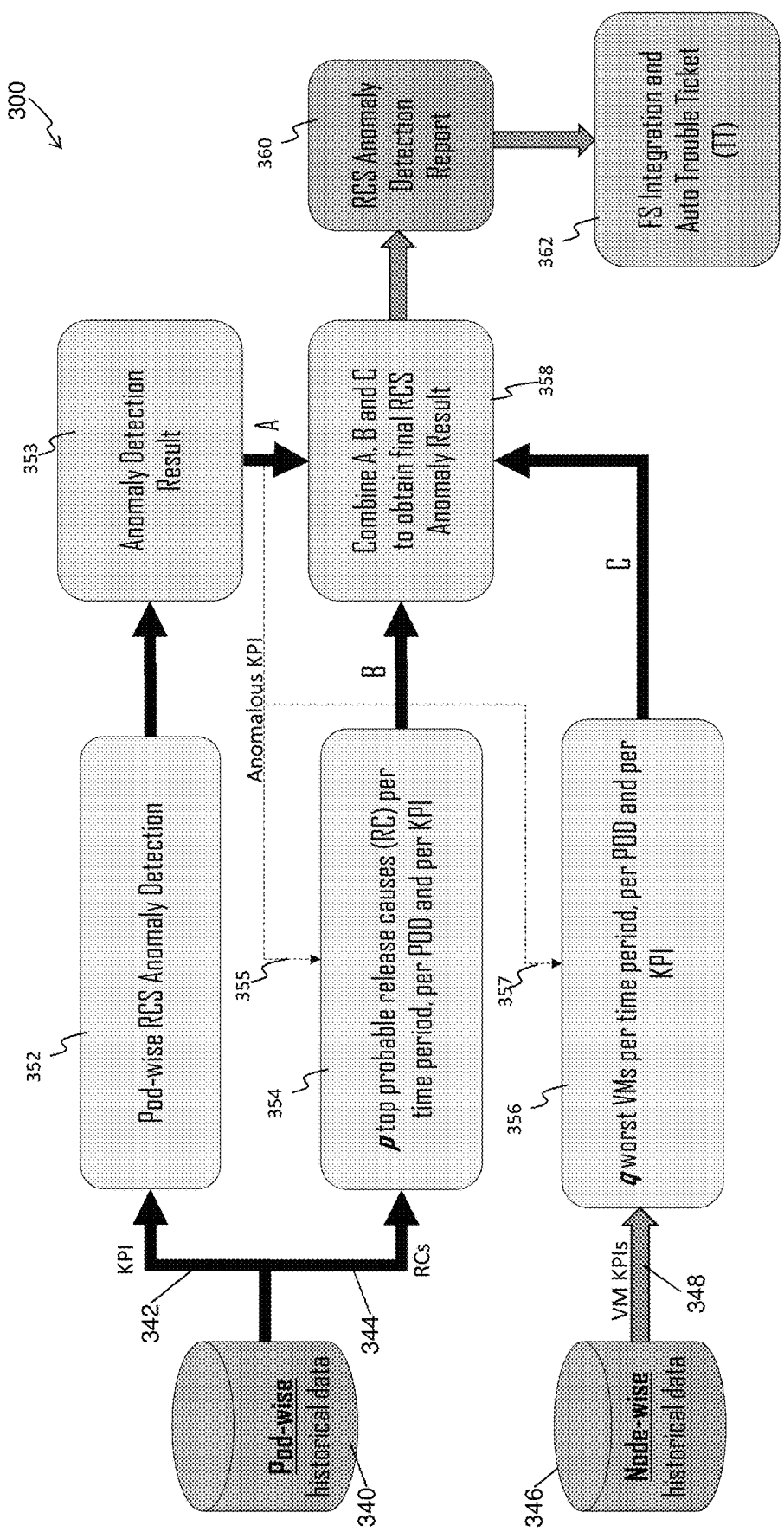
FIG. 3 is a flow chart of an anomaly detecting method, in accordance with some embodiments.

FIG. 3 is a flow chart of an anomaly detecting method 300, in accordance with some embodiments. In some embodiments, the method 300 is performed by the anomaly detecting system 200 to detect anomalies in a communications network.

At operation 340, pod-wise historical data of each KPI to be monitored for anomaly are selected to generate a KPI data set 342 of historical data of the KPI for anomaly detection. In some embodiments, pod-wise historical data refer to historical data of a KPI of a node across all pods in the communications network. In an example described with respect to FIG. 2, each of the pods has its own RCS Voice node, all RCS Voice nodes of all four pods have the same RCS Voice KPI to be monitored for anomaly, and the KPI data set 342 includes historical data of the RCS Voice KPI collected from all RCS Voice nodes of all pods in the communications network. A more detailed example of the KPI data set 342 is described with respect to FIGS. 4A-4B. Further, the pod-wise historical data of each KPI to be monitored for anomaly are processed to output an RC list 344 of RCs reported together with the KPI to be monitored. An example of the RC list 344 reported for a KPI is described with respect to FIG. 5A. Historical data of KPIs and associated RC lists are automatically generated by various hardware equipment and/or circuitry of the communications network, without human intervention. In some embodiments, operation 340 and the generation of the KPI data set 342 and/or RC list 344 are performed by the data selection module 251 accessing the database 240.

At operation 346, node-wise historical data of each KPI to be monitored for anomaly are extracted to generate a VM KPI data set 348 of the KPI to be monitored. In some embodiments, node-wise historical data refer to historical data of a KPI of one or more VMs of a node in a pod, such as KPIs 136, 137, 138 described with respect to FIG. 1. In an example, the VM KPI data set 348 include values of the KPI reported by one or more VMs of a node corresponding to the KPI. In some embodiments, operation 346 and the generation of the VM KPI data set 348 are performed by the data selection module 251 accessing the database 240.

In some embodiments, operations 340, 346 and/or the generations of the KPI data set 342, RC list 344, and/or VM KPI data set 348 are not necessarily performed in a particular order.

At operation 352, pod-wise RCS anomaly detection is performed, based on the KPI data set 342 selected for each KPI to be monitored. In some embodiments, operation 352 is performed by the machine learning module 252. An example process performed at operation 352 is described with respect to FIGS. 4A-4C. An anomaly detection result 353 of the pod-wise RCS anomaly detection at operation 352 is generated, e.g., in the form of an anomaly flag. For example, when the KPI to be monitored is identified as anomalous, the anomaly flag is assigned a logic value "1," whereas when the KPI to be monitored is identified as non-anomalous, the anomaly flag is assigned a logic value "0." In at least one embodiment, the assigned logic value ("1" or "0") is stored in association with the corresponding data point of the KPI in the database 140 or 240 for subsequent use, e.g., for calculating a KPI reference value as described herein. In some embodiments, the anomaly detection result 353 includes anomalous KPIs and does not include non-anomalous KPI. In some embodiments, the anomaly detection result 353 for an anomalous KPI further comprises one or more of an ID of the anomalous KPI, the corresponding pod and node, a timestamp, a value of the KPI that caused the KPI to be identified as anomalous, a reference value of the KPI based on the historical data of the KPI, or the like. As schematically illustrated in FIG. 3, the anomaly detection result 353 constitutes a report part A of an anomaly detection report. In some embodiments, operation 352 is performed individually for each KPI to be monitored, based on the KPI data set 342 specifically selected for that KPI. For example, when there are N KPIs (where N is a natural number which may be, e.g., a few thousand) to be monitored across multiple pods of a communications network, operation 352 is executed N times each time for one of the KPIs.

At operation 354, up to p top probable release causes (RCs) per time period, per pod and per KPI are identified, based on the RC list 344 associated with the KPI. As described herein, p=3 in at least one embodiment. Other values of p are within the scopes of various embodiments. In at least one embodiment, the time period during which RCs are reported for the KPI is an hour. Other time periods are within the scopes of various embodiments. An example process performed at operation 354 is described with respect to FIG. 5B. In some embodiments, operation 354 is performed by the RCA and VM report module 253. As schematically illustrated in FIG. 3, a result of operation 354 constitutes a report part B of an anomaly detection report.

In some embodiments, operation 354 is performed based on the anomaly detection result 353 of operation 352. For example, after operation 352 is performed and identifies a KPI as an anomalous KPI, the anomaly detection result 353 identifying the anomalous KPI is provided, as schematically indicated at 355, as an input for operation 354. Upon receiving the anomaly detection result 353 identifying the anomalous KPI, an RC list 344 associated with the anomalous KPI is generated or extracted from the pod-wise historical data. Operation 354 is then performed based on the RC list 344 for the identified anomalous KPI, and report part B is output to identify up to p top probable RCs of the anomalous KPI. When a KPI is not identified by operation 352 as anomalous, a RC list 344 associated with the non-anomalous KPI is not extracted and operation 354 is not performed. As a result, in one or more embodiments, it is possible to reduce processing amount and/or computer resources assumption, although the sequential executions of operations 352, 354 may increase processing time.

In some embodiments, operation 354 is performed independently from operation 352. For example, operation 354 is performed before, in parallel with, or after operation 352. The anomaly detection result 353 of operation 352 is not provided to or used as an input for operation 354. An RC list 344 is extracted for every KPI to be monitored and operation 354 is performed to identify up to p top probable RCs of every KPI to be monitored, regardless of whether or not the KPI is anomalous. Report part B includes up to p top probable RCs of every KPI to be monitored. At operation 358 as described herein, a portion of report part B corresponding to non-anomalous KPIs will be discarded, and the remaining portion of report part B corresponding to anomalous KPIs will be matched with report part A, and make it to an anomaly detection report 360. As a result, in one or more embodiments, it is possible to reduce processing time because operation 354 does not depend on operation 352, although processing amount and/or computer resources assumption may be increased.

At operation 356, up to q worst VMs per time period, per pod and per KPI are identified, based on the VM KPI data set 348 in a node associated with the KPI. As described herein, q=3 in at least one embodiment. Other values of q are within the scopes of various embodiments. In at least one embodiment, the time period during which VM KPI data are reported for the KPI is an hour. Other time periods are within the scopes of various embodiments. An example process performed at operation 356 is described with respect to FIG. 6. In some embodiments, operation 356 is performed by the RCA and VM report module 253. As schematically illustrated in FIG. 3, a result of operation 356 constitutes a report part C of an anomaly detection report.

In some embodiments, operation 356 is performed based on the anomaly detection result 353 of operation 352. For example, after operation 352 is performed and identifies a KPI as an anomalous KPI, the anomaly detection result 353 identifying the anomalous KPI is provided, as schematically indicated at 357, as an input for operation 356. Upon receiving the anomaly detection result 353 identifying the anomalous KPI, a VM KPI data set 348 associated with the anomalous KPI and reported from VMs in the node corresponding to the anomalous KPI is generated or extracted from the node-wise historical data. Operation 356 is then performed based on the VM KPI data set 348 for the identified anomalous KPI, and report part C is output to identify up to q worst VMs on the node corresponding to the anomalous KPI. When a KPI is not identified by operation 352 as anomalous, a VM KPI data set 348 associated with the non-anomalous KPI is not extracted and operation 356 is not performed. As a result, in one or more embodiments, it is possible to reduce processing amount and/or computer resources assumption, although the sequential executions of operations 352, 356 may increase processing time.

In some embodiments, operation 356 is performed independently from operation 352. For example, operation 356 is performed before, in parallel with, or after operation 352. The anomaly detection result 353 of operation 352 is not provided to or used as an input for operation 356. A VM KPI data set 348 is extracted for every KPI to be monitored and operation 356 is performed to identify up to q worst VMs on the node corresponding to every KPI to be monitored, regardless of whether or not the KPI is anomalous. Report part C includes up to q worst VMs of every KPI to be monitored. At operation 358 as described herein, a portion of report part C corresponding to non-anomalous KPIs will be discarded, and the remaining portion of report part C corresponding to anomalous KPIs will be matched with report part A, and make it to the anomaly detection report 360. As a result, in one or more embodiments, it is possible to reduce processing time because operation 356 does not depend on operation 352, although processing amount and/or computer resources assumption may be increased.

In some embodiments, one of operations 354, 356 is performed depending on operation 352, whereas the other of operations 354, 356 is performed independently from operation 352. In some embodiments, operations 354, 356 are performed independently from one another, e.g., operation 356 is performed before, in parallel with, or after operation 354. In some embodiments, at least one of operations 354, 356 is omitted.

At operation 358, report parts A, B, and C from operations 352, 354, 356 are combined for each anomalous KPI, and the anomaly detection report 360 including report parts A, B, and C for all detected anomalous KPIs is generated. A specific manner in which operation 358 is performed depends on how operation 354 and/or operation 356 is performed with respect to operation 352.

In an example, operations 354, 356 are performed depending on operation 352. Each time operation 352 identifies an anomalous KPI, executions of operations 354, 356 are triggered to identify the corresponding p top probable RCs and q worst VMs. The combination of report parts A, B, and C at operation 358 is performed for each anomalous KPI individually. The anomalous KPI and the corresponding p top probable RCs and q worst VMs is entered as an entry into the anomaly detection report 360. In a subsequent iteration when operation 352 identifies another anomalous KPI, the process is repeated and another entry is added to the anomaly detection report 360.

In another example, operations 354, 356 are performed independently from operation 352, to generate report part B including up to p top probable RCs of each and every of N KPIs to be monitored, and report part C including up to q worst VMs for each and every of N KPIs to be monitored. Meanwhile, operation 352 is performed N times individually for the N KPIs to identify, in report part A, a list of multiple anomalous KPIs. The list of multiple anomalous KPIs are matched with report parts B and C to discard portions corresponding to non-anomalous KPIs, while keeping the remaining portions corresponding to the anomalous KPIs listed in report part A. As a result, the anomaly detection report 360 is obtained. An example of a portion of the anomaly detection report 360 is described with respect to FIG. 7.

At operation 362, based on the anomaly detection report 360, one or more TTs are automatically raised and/or FS integration is performed. In some embodiments, operation 362 is omitted.

In some embodiments, the method 300 is repeatedly performed at a predetermined time interval, for example, every hour, to detect anomalies across the communications network, based on rolling sets of historical data that are constantly and/or periodically collected. As a result, real-time or near real-time network monitoring and/or trouble shooting is achievable.

In some embodiments, the entire method 300 is automatically performed without human intervention. In at least one embodiment, human involvement occurs at the very end of method 300 when the anomaly detection report 360 and/or the automatically raised TTs at operation 362 are presented to a domain expert or network engineer. In some embodiments, for each anomalous KPI, the anomaly detection report 360 identifies the pod, node, time period where/when the anomaly occurred, the top probable RCs, i.e., probable causes or reasons why the anomaly occurred, and worst VMs, i.e., the VMs most likely responsible for the anomaly. This information is easy-to-understand and assists the domain expert or network engineer in charge to make timely decisions in one or more of performance optimization, outage prevention, trouble shooting, network planning, or the like. In at least one embodiment, the ability to simply receive historical data of numerous KPIs (e.g., several thousand KPIs) across the communications network, and quickly and efficiently generate a concise report of a much lower number (e.g., a few dozen or hundred) of anomalies and their top probable causes (RCs) and/or responsible VMs is a significant advantage over manual processing. Indeed, given the vast amount of KPI data generated periodically in a communications network, manual processing consumes an impractically large amount of time. Other disadvantages of manual processing include low accuracy due to the possibility of missing degraded KPIs, the absence of an accurate correlative analysis to correlate between degraded KPIs and probable RCA/VMs, undesirable simultaneous opening/execution of different modules to detect degradations and to analyze the RCA-escalation, no consideration for an auto-healing network, or the like. In at least one embodiment, one or more of the described disadvantages of manual processing are avoidable. For example, one or more of the following advantages are achievable in some embodiments: support for auto-healing networks, fast detection of network problems and fast escalation to ensure fast resolution, reduced manual work to minimum, increased analysis accuracy.

Figure 4A:
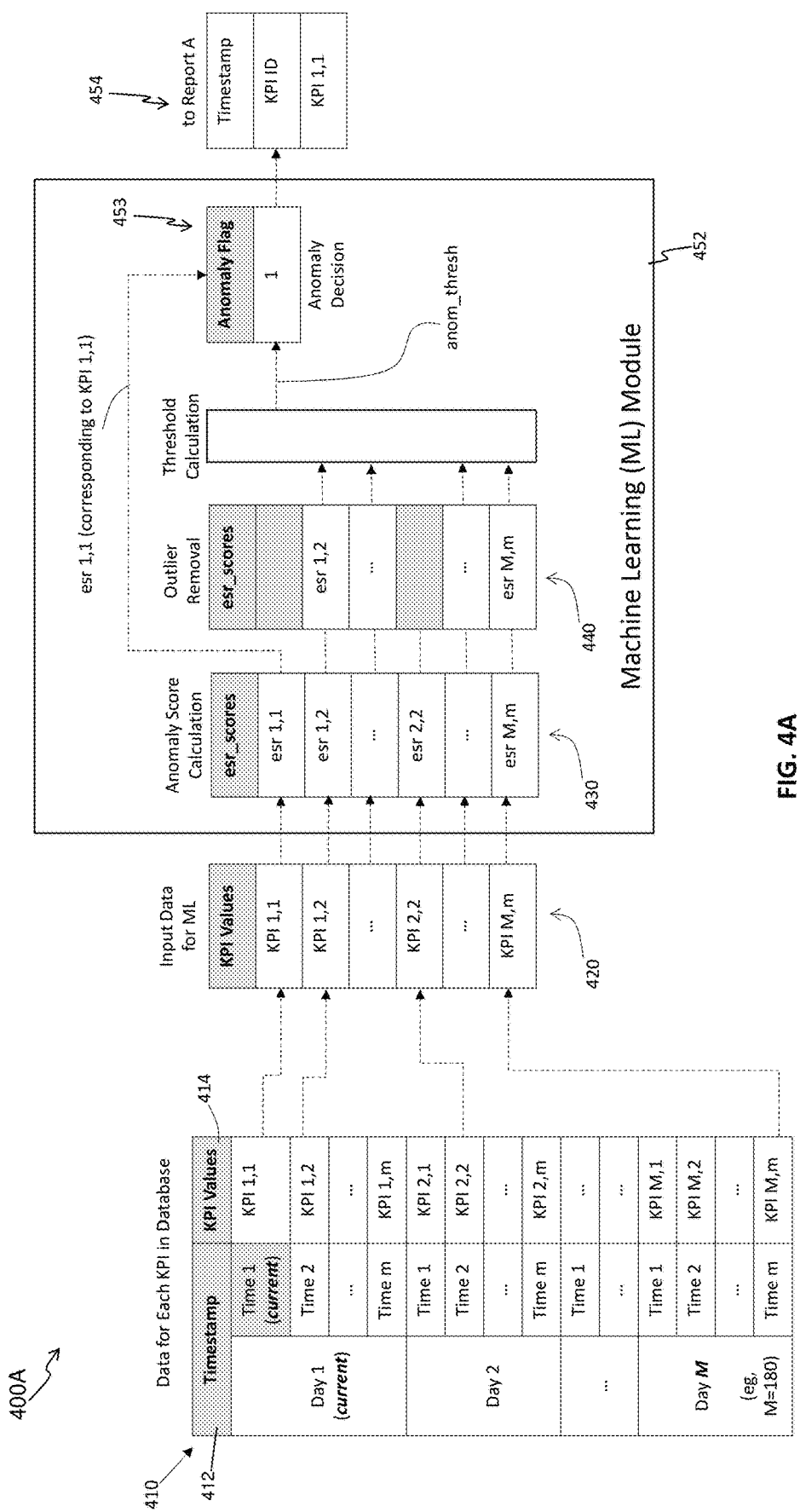
FIGS. 4A and 4B are schematic diagrams showing example data at various stages in one or more anomalous feature detecting processes, in accordance with some embodiments.

FIG. 4A is schematic diagram showing example data at various stages in an anomalous feature detecting process 400A, in accordance with some embodiments. In some embodiments, the anomalous feature detecting process 400A corresponds to operation 352 and/or is executed in the machine learning module 252 and/or by the anomaly detecting device 150.

As described herein, for each KPI to be monitored for anomaly, a KPI data set is selected from the historical data of the KPI collected in a database. An example KPI data set is described with respect to FIG. 4A. In FIG. 4A, a table 410 includes KPI data extracted for one KPI from a database, such as the database 140. The database includes KPI data generated and/or reported periodically for various KPIs, from various pods, nodes and/or VMs throughout a communications network. KPI data of other KPIs to be monitored for anomaly are not illustrated in FIG. 4A, and are arranged and/or processed in a similar manner.

In FIG. 4A, KPI data are stored in the table 410 as a plurality of data points associated with a KPI ID of the corresponding KPI. A KPI ID is not illustrated in FIG. 4A for simplicity. In some embodiments, as described herein, a KPI ID comprises a name of the KPI, and a pod and a node corresponding to the KPI. Each data point in the table 410 comprises a timestamp and a KPI value corresponding to the timestamp. The table 410 has a column 412 including timestamps of the data points, and a column 414 including KPI values of the data points. Each row in the table 410 corresponds to a data point. The data points are arranged in the chronological order, with the newer data points are listed first at the top of the table 410.

The timestamp of each data point has two parts, i.e., a first part indicating the day and a second part indicating the time of the day. For example, the data point at the first row in the table 410 has a timestamp including Day 1 and Time 1, and a corresponding KPI value KPI 1,1. There are m times from Time 1 to Time m in each day, where m is a natural number. In each day, Time 2 is the time period before Time 1, Time 3 is the time period before Time 2, or the like. In some embodiments, m=24, i.e., the KPI data in the table 410 are presented with hourly granularity. Other values of m are within the scopes of various embodiments. The described timestamp configuration is an example. Other timestamp configurations are within the scopes of various embodiments.

The association between a timestamp, e.g., Day 1, Time 1, and a KPI value, e.g., KPI 1,1, in a data point does not necessarily mean that the KPI value is collected or stored or reported at the exact time and date in the corresponding timestamp. In some embodiments, a KPI value is collected and/or reported within a predetermined time period associated with the timestamp. For example, for Day 1, the KPI value KPI 1,1 is collected and/or reported between Time 2 and Time 1, or within a predetermined time period immediately preceding Time 1. There are situations where KPI data of different KPIs are collected and/or reported at different points in time and/or at different time intervals. For example, KPI data for some KPIs are reported hourly, whereas KPI data for some other KPIs are reported every 5 minutes, or twice every hour. When a KPI has multiple KPI values reported within the time period corresponding to a specific timestamp (e.g., Day 1, Time 1), one of the KPI values is selected for anomaly detection, or a new, e.g., average or mean, KPI value is generated from the actual KPI values for anomaly detection. In some embodiments, the database simply stores historical data which are then selectively extracted and/or pre-processed, e.g., by the data selection module 251, to generate the table 410.

In Table 410, the KPI value KPI 1,1, at Day 1, Time 1 represents a KPI data point to be monitored for anomaly detection. The data points in Day 1, ... Day M are subject to machine learning, where M is a natural number. Day 2 is the day before Day 1, Day 3 is the day before Day 2, or the like. In some embodiments, M=180, i.e., a set of about 6 month worth of historical data is used for machine learning and for determining whether the KPI value KPI 1,1 is anomalous or not. Other values of M are within the scopes of various embodiments. In one or more embodiments, Day 1 is the current or same day when anomaly detection is performed, i.e., the anomaly detection is performed in real-time or near real-time. In at least one embodiment, Day 1 is a day in the past, i.e., the anomaly detection is applied to examine past anomalies.

To determine whether the KPI value KPI 1,1 at Day 1, Time 1, is anomalous or not, a corresponding KPI data set 420 of historical data is selected. The KPI data set 420 includes all data points across all m times, i.e., Time 1, Time 2, ... Time m, in all M days, i.e., Day 1, Day 2, ... Day M. The KPI data set 420 serves as input data for a machine learning module 452. In some embodiments, the KPI data set 420 corresponds to the KPI data set 342 and/or the machine learning module 452 corresponds to the machine learning module 252.

The machine learning module 452 is configured to apply a machine learning algorithm to calculate, for each KPI value in the KPI data set 420, a corresponding anomaly score. For example, the machine learning module 452 generates an anomaly score esr 1,1 corresponding to KPI 1,1, an anomaly score esr 1,2 corresponding to KPI 1,2, or the like. As a result, the machine learning module 452 generates an anomaly score set 430 corresponding to the KPI data set 420. In some embodiments, the machine learning algorithm used to calculate anomaly scores from the corresponding KPI values corresponds to the first machine learning module 255.

In some embodiments, the machine learning algorithm used to calculate anomaly scores from the corresponding KPI values is a unsupervised machine learning algorithm. An example machine learning algorithm for anomaly score calculation is an Enhanced Spectral Residual (ESR) algorithm. In a specific example, the ESR algorithm is expressed by the following equations:

$$A(f) = \text{Amplitude}(\mathfrak{F}(x)) \quad (1)$$

$$P(f) = \text{Phrase}(\mathfrak{F}(x)) \quad (2)$$

$$L(f) = \log(A(f)) \quad (3)$$

$$AL(f) = hq(f) \cdot L(f) \quad (4)$$

$$R(f) = L(f) - AL(f) \quad (5)$$

$$S(x) = \| \mathfrak{F}^{-1}(\exp(R(f) + iP(f))) \| \quad (6)$$

$$MFS(x) = [S(x) - A_4 S(x)] / A_4 S(x) \quad (7)$$

Specifically, Fast Fourier Transform (FFT) is performed on the KPI data set 420, which is an input time series $\tilde{x}$ including a plurality of data points x each corresponding to one of the KPI values in the KPI data set 420. The result of the FFT is a spectrum $\mathcal{F}(\tilde{x})$.. A(f) and P (f) are correspondingly amplitude and phase of the spectrum, L(f) and AL(f) are correspondingly log amplitude spectrum and averaged log amplitude spectrum, R(f) and S(x) are correspondingly spectral residual and saliency map, and $A_4S(x)$ is 4-time filtered saliency map using different window lengths all the four times. The x corresponds to each input data point, e.g., KPI 1,1, KPI 1,2, . . . KPI M,m, and the obtained MFS(x) is the anomaly score corresponding to each input data point, e.g., esr 1,1, esr 1,2, . . . esr M,m. A different number of times the saliency map is filtered is possible in some embodiments. Other machine learning algorithms for calculating anomaly scores are within the scopes of various embodiments.

The machine learning module 452 is further configured to apply a further machine learning algorithm to perform outlier removal on the anomaly score set 430. In some embodiments, the machine learning algorithm for outlier removal corresponds to the second machine learning module 256. In some embodiments, the machine learning algorithm for outlier removal is a unsupervised machine learning algorithm. An example machine learning algorithm for outlier removal is available at MLbase. Other machine learning algorithms for outlier removal are within the scopes of various embodiments. The machine learning algorithm for outlier removal identifies from the anomaly score set 430 one or more outliers which are dissimilar from the other anomaly scores beyond an acceptable or predetermined threshold. In the example configuration in FIG. 4A, esr 2,2 is identified as an outlier and is excluded from further consideration. The anomaly score esr 1,1 to be considered for anomaly detection is also excluded, because the subsequent anomaly threshold calculation is based on past KPI data and should not be affected by the current KPI data. A result of the machine learning algorithm for outlier removal is a reduced anomaly score set 440 which does not include the removed outliers as well as the current data point, i.e., the reduced anomaly score set 440 does not include esr 1,1, esr 2,2. The outlier removal improves the anomaly detection accuracy in one or more embodiments.

The machine learning module 452 is further configured to calculate an anomaly threshold anom_thresh, based on the reduced anomaly score set 440. An example algorithm for calculating an anomaly threshold is described with respect to FIG. 4C. In some embodiments, the anomaly threshold calculation is performed by the one or more logics 257. In some embodiments, the described outlier removal is omitted, and the anomaly score set 430 (except for esr 1,1) is fully used for calculating an anomaly threshold.

The machine learning module 452 is further configured to compare the calculated anomaly threshold with the anomaly score esr 1,1 corresponding the KPI value KPI 1,1 to be considered for anomaly detection. When the anomaly score esr 1,1 is greater than the anomaly threshold, KPI 1,1 and the corresponding KPI are identified as anomalous, and a corresponding anomaly flag 453 is updated to logic "1." Otherwise, the KPI 1,1 and the corresponding KPI are identified as non-anomalous, and the corresponding anomaly flag 453 remains at logic "0." In response to a determination that KPI 1,1 is anomalous as indicated at the corresponding anomaly flag 453 being logic "1" in FIG. 4A, the machine learning module 452 outputs report part A, as indicated at 454 in FIG. 4A, including the corresponding timestamp (e.g., Day 1, Time 1), the corresponding KPI ID (e.g., KPI name, and the corresponding pod and node), and the anomalous KPI value KPI 1,1.

In some embodiments, the data point with KPI 1,1 and the corresponding anomaly flag 453 are reported, e.g., by the anomaly detecting device 150 or 250, back to the database 140 or 240 to be stored in the database 140 or 240 to reflect in the database 140 or 240 that the data point with KPI 1,1 has been found anomalous or non-anomalous (depending on the logic value "1" or "0" of the anomaly flag 453). As a result, the database 140 or 240 is updated to store various historic KPI data points each with a corresponding anomaly flag.

In a subsequent iteration of anomaly detection, the described process 400A is executed again for the same KPI, but with respect to a next data point, e.g., with a KPI value KPI 0,m at Day 0, Time m (not shown) immediately after Day 1, Time 1. The KPI data set 420 is shifted forward in time to remove the oldest data point, i.e., to remove KPI M,m, and to include the next data point to be considered for anomaly detection, i.e., to include KPI 0,m. The size of, or the number of data points in, the KPI data set 420 remains unchanged. A new anomaly score set corresponding to the new KPI data set (which was shifted forward in time relative to the KPI data set 420) is calculated by the machine learning algorithm for anomaly score calculation, in a manner similar to that described with respect to the anomaly score set 430. The new anomaly score set is subject to outlier removal to generate a reduced new anomaly score set, in a manner similar to that described with respect to the reduced anomaly score set 440. A new anomaly threshold is calculated based on the reduced new anomaly score set, and is used to determine whether KPI 0,m is anomalous or not, in a manner similar to that described with respect to KPI 1,1. Because a new anomaly threshold is recalculated per KPI per timestamp, the anomaly threshold in one or more embodiments is considered as a dynamic anomaly threshold. Such a dynamic anomaly threshold includes anomaly detection accuracy, in at least one embodiment.

In a specific example in accordance with some embodiments with hourly data granularity, the machine learning module 452 is executed, every hour, N times each time for a different KPI among the N KPIs to be monitored for anomaly. As new KPI data come in, the machine learning module 452 is repeatedly executed per KPI and based on hourly KPI data, to perform anomaly detection in real-time or near real-time.

Figure 4B:
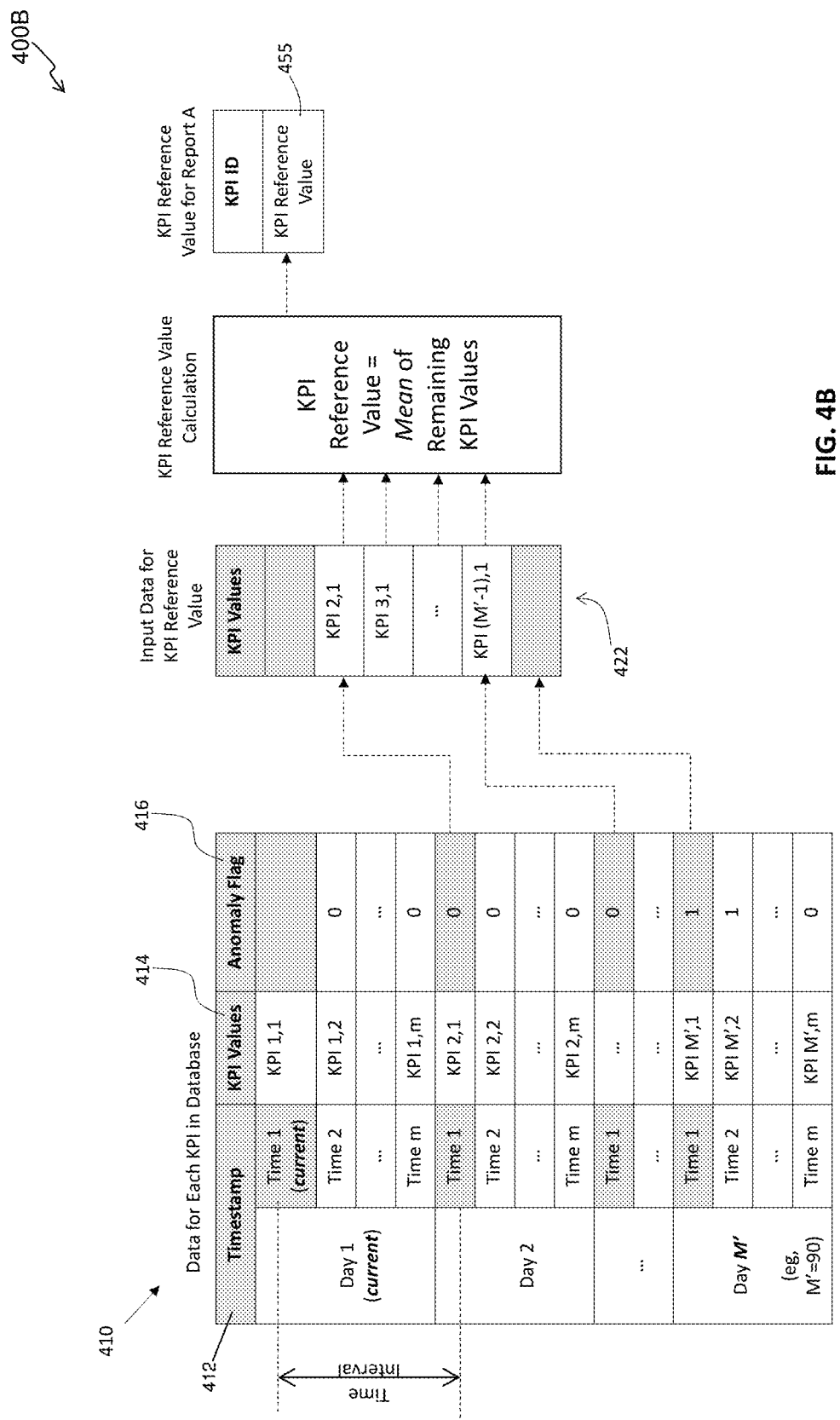

FIG. 4B is schematic diagram showing example data at various stages in an reference value calculation process 400B, in accordance with some embodiments. In some embodiments, the process 400B is performed together with the process 400A by the anomaly detecting device. In some embodiments, the process 400B is omitted.

To calculate a KPI reference value, past KPI data are selected. Specifically, a KPI data set 422 is selected from the table 410, but in a manner different from the KPI data set 420. A difference from the KPI data set 420 is that the KPI data set 422 for KPI reference value calculation does not include the current KPI value KPI 1,1. A further difference from the KPI data set 420 is that the KPI data set 422 includes KPI data from Day 2 to Day M' where M' is a natural number. In some embodiments, M'<M, i.e., KPI data set 422 is a subset of the KPI data set 420. For example, in at least one embodiment, M'=90, i.e., a set of about 3 month worth of historical data is used for calculating a reference value.

Another difference from the KPI data set 420 is that while the KPI data set 420 includes all data points at all times in all days, the KPI data set 422 includes fewer and selected data points, based on two criteria. The first criterion is time and the second criterion is the previously determined anomaly flag. As to time, the data points in the KPI data set 422 are at a predetermined time interval from each other. For example, the timestamps of all historical data points in the KPI data set 422 have the same Time 1 as the current data point with KPI 1,1, but on different days, i.e., Day 1, Day 2 . . . Day M'. The time interval between successive historical data points in the KPI data set 422 is one day. This time interval of one day is an example, and other time intervals are within the scopes of various embodiments. Further, past KPI values that were previously determined as anomalous are not included in the KPI data set 422. Specifically, the table 410 includes, for each past KPI data point, a corresponding anomaly flag 416 previously determined for the past KPI data point. For example, the KPI data point with KPI 2,1 was previously determined as non-anomalous, and is stored in the database with the corresponding anomaly flag with value "0." The KPI data point with KPI 2,1 is included in the KPI data set 422. For another example, the KPI data point with KPI M',1 was previously determined as anomalous, and is stored in the database with the corresponding anomaly flag with value "1." The KPI data point with KPI M',1 is excluded from the KPI data set 422, even though it has the same Time 1 as the current data point with KPI 1,1. In short, the KPI data set 422 includes non-anomalous past data points having the same time, e.g., Time 1, as the current data point to be considered for anomaly detection. The manner in which the anomaly flag was determined and stored in the updated database 140, 240, for each past data point is as described herein with respect to FIG. 4A.

The anomaly detecting device is further configured to calculate a KPI reference value based on the past data points in the reduced KPI data set 442. For example, the KPI reference value is calculated as a mean or average value of the KPI values remaining in the reduced KPI data set 442 after considering the timestamps and anomaly flags, as described herein. Other manners for calculating a KPI reference value are within the scopes of various embodiments. The calculated KPI reference value 455 is included in the report part A in association with the KPI ID when the KPI is identified as anomalous.

In some embodiments, the process 400B is performed sequentially to the process 400A. For example, the process 400B is performed in response to the KPI being identified by the process 400A as being anomalous, and the process 400B is not performed when the KPI is identified as non-anomalous. In some embodiments, the process 400B is performed independently from the process 400A. For example, the process 400B is performed in parallel with, and regardless of an anomaly detection result, of the process 400A. When the KPI is identified by the process 400A as anomalous, the KPI reference value calculated by the process 400B is output through the report part A. When the KPI is identified by the process 400A as non-anomalous, the calculated KPI reference value is discarded.

Figure 4C:
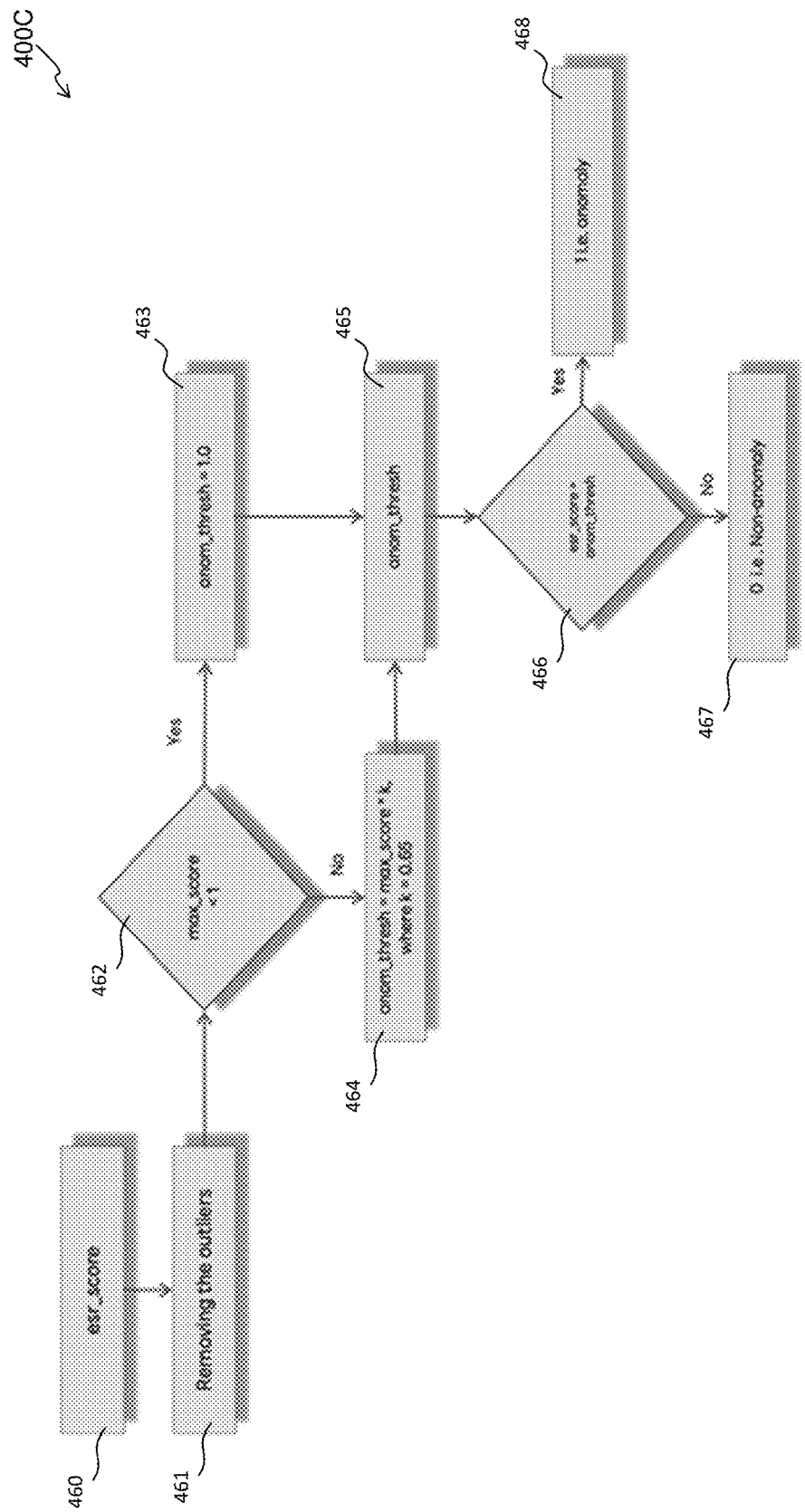
FIG. 4C is a flow chart of an anomalous feature detecting process, in accordance with some embodiments.

FIG. 4C is a flow chart of an anomalous feature detecting process 400C, in accordance with some embodiments. In some embodiments, the process 400C corresponds to the process 400A. In some embodiments, the process 400C corresponds to operation 352 and/or is executed in the machine learning module 252 and/or by the anomaly detecting device 150. The process 400C comprises operations 460-468, among which operations 462-465 include additional details of an example algorithm for calculating a dynamic anomaly threshold.

At operation 460, an anomaly score set esr_score of a plurality of anomaly scores is calculated. In at least one embodiment, the anomaly score set esr_score is calculated in a manner similar to the anomaly score set 430.

At operation 461, outlier removal is performed on the anomaly score set esr_score to obtained a reduced anomaly score set. In at least one embodiment, the outlier removal is performed in a manner similar to that described with respect to the reduced anomaly score set 440. A maximum score in the reduced anomaly score set is identified as max_score.

At operation 462, the maximum score max_score is compared with 1. When max_score is smaller than 1, the process proceeds to operation 463; otherwise, the process proceeds to operation 464.

At operation 463, i.e., when max_score is smaller than 1, the anomaly threshold anom_thresh is set to be 1. The process then proceeds to operation 465.

At operation 464, i.e., when max_score is not smaller than 1, the anomaly threshold anom_thresh is calculated by the following equation:

$$\text{anom\_thresh} = \text{max\_score} * k \qquad (8)$$

The coefficient k is selectable and/or adjustable. The value of k is related to the sensitivity of the machine learning algorithm for anomaly detection. At a higher value of k, the sensitivity of the machine learning algorithm for anomaly detection is lower, meaning that the KPI is less likely to be identified as anomalous, but an anomalous KPI decision if made is likely correct. In other words, accuracy is increased, but a risk that an anomalous KPI might be missed is also increased. At a lower value of k, the sensitivity of the machine learning algorithm for anomaly detection is higher, meaning that the KPI is more likely to be identified as anomalous, but with some likelihood that the anomalous KPI decision might be incorrect. In other words, accuracy is decreased, but a risk that an anomalous KPI might be missed is reduced. An optimal value of k achieves high accuracy of anomaly detection while minimizing the risk that an anomalous KPI might be missed. In some embodiments, k is in a range from 0.1 to 2. In at least one embodiment, k=0.65 at which an accuracy of anomaly detection at about 99% is achievable.

At operation 465, the anomaly threshold anom_thresh is determined based on either operation 463 or operation 464.

At operation 466, the anomaly threshold anom_thresh is compared with the anomaly score of the data point to be considered for anomaly detection, in a manner similar to that described with respect to the process 400A.

At operation 467, when operation 466 determines that the anomaly score is not greater than the anomaly threshold, the KPI is identified as non-anomalous, i.e., the anomaly flag is set at "0."

At operation 468, when operation 466 determines that the anomaly score is greater than the anomaly threshold, the KPI is identified as anomalous, i.e., the anomaly flag is set at "1." A report part A is generated for the anomalous KPI, as described with respect to FIGS. 4A-4B.

Figure 5A:
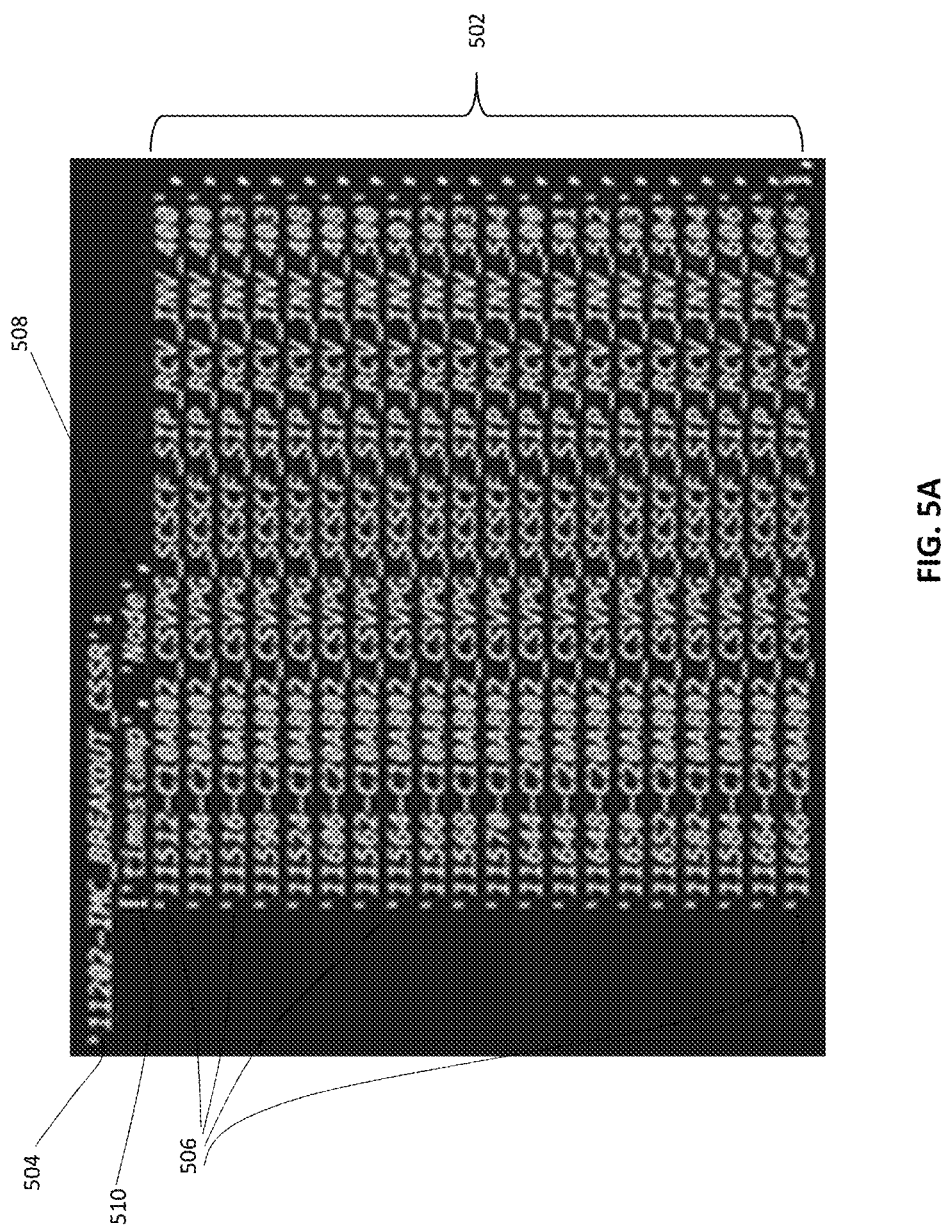
FIG. 5A is an example list of release causes (RCs), in accordance with some embodiments.

FIG. 5A is an example list 502 of release causes (RCs) associated with a KPI 504, in accordance with some embodiments.

In the example in FIG. 5A, the KPI 504 has a KPI name of "11202-IMC_BREAKOUT_CSSR." In the KPI data automatically reported for the KPI 504, the RC list 502 of a plurality of SIP released causes (RCs) 506 is included and is associated with the KPI 504, a node 508 corresponding to the KPI, and a corresponding timestamp 510. In FIG. 5A, the timestamp 510 and the node 508 are not specifically indicated, for simplicity. The timestamp 510 is the same as the timestamp of the current KPI data point being considered for anomaly detection. For example, when the data point KPI 1,1 of the KPI 504 is identified to be anomalous by the process 400A, the RC list 502 associated with the anomalous KPI 504 and having the same timestamp 510 (i.e., Day 1, Time 1) as the data point KPI 1,1 is considered as including one or more possible root causes (RCA) for the detected anomalous data point KPI 1,1. Some RCs in the RC list 502 are more likely than other RCs in the same RC list 502 to be the actual RCAs. In practice, an actual list of RCs reported for a KPI during a time period corresponding to the timestamp of an anomalous data point of the KPI may be much longer than the example RC list 502 in FIG. 5A. Sometimes, an actual RC list may include several hundred RCs reported, e.g., within an hour when the KPI data has hourly granularity. It is impossible and/or impractical for a domain expert of network engineer to review such a long list of RCs to identify possible RCAs, especially given that the list is just for one KPI and for one time period while there are many more KPIs and time periods to be reviewed. To address this concern, some embodiments are configured to automatically identify the top probable RCs that are most likely to be the actual RCAs corresponding to the detected anomaly.

Figure 5B:
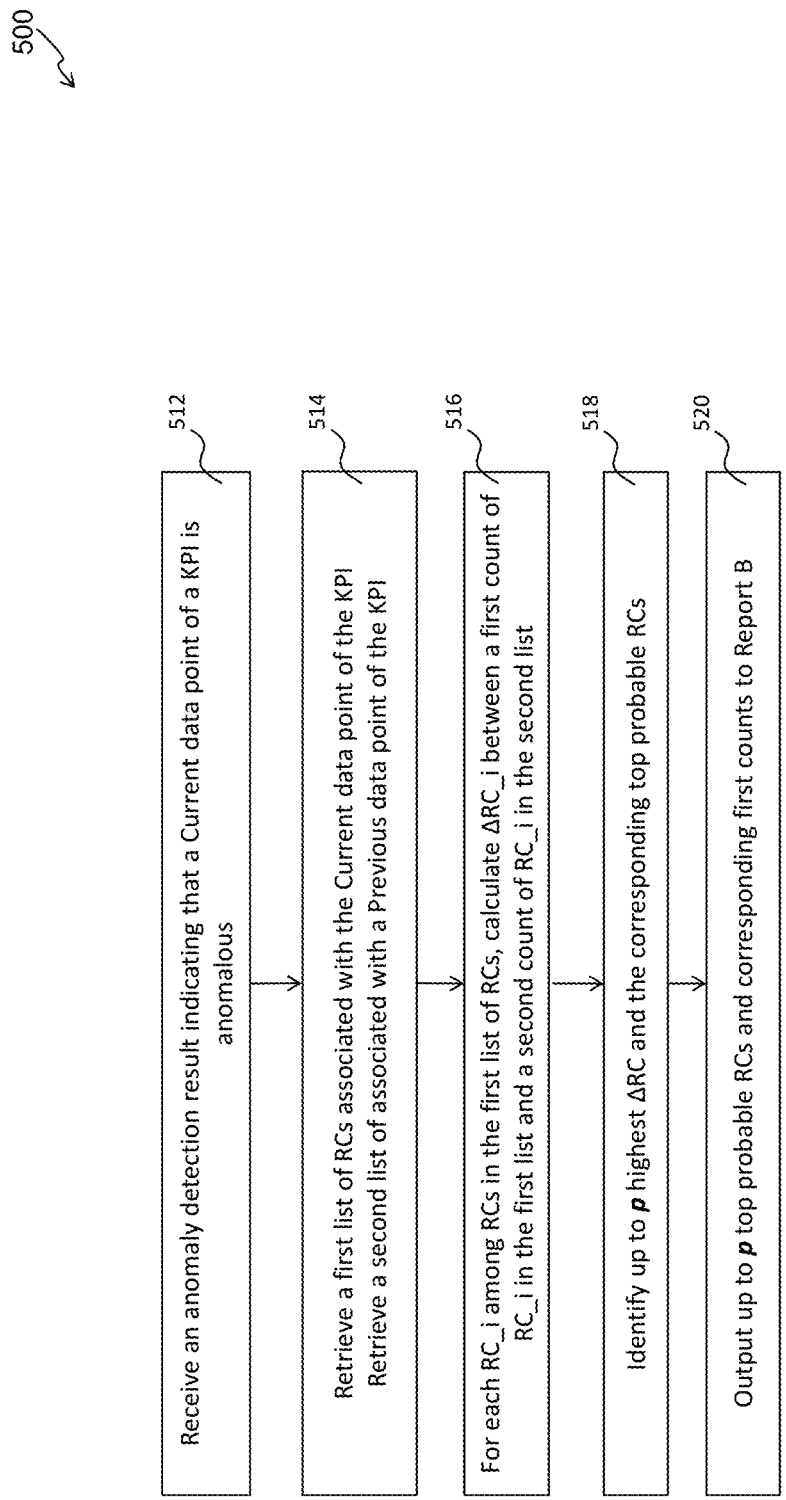
FIG. 5B is a flow chart of a probable RC detecting process, in accordance with some embodiments.

FIG. 5B is a flow chart of a probable RC detecting process 500, in accordance with some embodiments. In some embodiments, the process 500 corresponds to operation 354 and/or is executed in the RCA and VM report module 253 and/or by the anomaly detecting device 150. The process 500 is an example of operation 354 being executed in sequence to operation 352, as described with respect to FIG. 3. A process similar to the process 500 and is directed to operation 354 being executed independently of operation 352 is within the scopes of various embodiments. The process 500 includes operations 512-520.

At operation 512, an anomaly detection result indicating that a current data point of a KPI is anomalous is received, e.g., as described at 355 in FIG. 3. For example, the current data point having the KPI value KPI 1,1 is identified as anomalous.

At operation 514, in response to the anomaly detection result received at operation 512, two lists of RCs are retrieved. The first list of RCs corresponds to the current data point that is identified as anomalous, i.e., KPI 1,1. The second list of RCs corresponds to a previous data point of the same KPI, e.g., any data point in the KPI data set 420. In an example, the immediately preceding data point, i.e., KPI 1,2, is selected, and the second list of RCs corresponding to KPI 1,2 is retrieved. In some embodiments, the retrieved lists of RCs correspond to the RC list 344 described with respect to FIG. 3.

At operation 516, for each RC_i in the first list of RCs, a count difference ΔRC_i between a first count of RC_i in the first list and a second count of RC_i in the second list is calculated. For example, assuming that the list RC list 502 in FIG. 5A is the first list of RCs corresponding to the anomalous current data point. For the first RC in the RC list 502, i.e., "11512-C10A802_CSVPG_SCSCF_SIP_RCV_INV_400," the number of occurrences (i.e., first count) of the first RC in the RC list 502 is determined. For example, the first count of the first RC is 12, i.e., the first RC occurs 10 times in the RC list 502. For the same first RC, the number of occurrences (i.e., second count) of the first RC in the second list of RCs (not shown) corresponding to the previous data point KPI 1,2 is determined. For example, the second count of the first RC in the second list of RCs is 10. The count difference ΔRC_1 for the first RC is 2. The process is repeated for the remaining RCs in the RC list 502. For example, for the second RC in the RC list 502, i.e., "11594-C20A802_CSVPG_SCSCF_SIP_RCV_INV_400," the first count is 50, the second count is 30, and the count difference ΔRC_2 for the second RC is 20.

At operation 518, up top highest ΔRC and the corresponding RCs in the first list of RCs are identified. For example, the second RC in the first RC list 502 has the highest count difference of 20 and is identified as a top probable RC. Assuming that a third RC in the first RC list 502, i.e., "11516-C10A802_CSVPG_SCSCF_SIP_RCV_INV_403," has a first count of 40, a second count of 22, and a second highest count difference of 18, the third RC is also identified as a top probable RC. The process is repeated to identify, if possible, p top probable RCs. In some embodiments, as described herein, p=3. A reason for selecting p=3 is that at p greater than 3, the anomaly detection report becomes too crowded and may include RCs which are less likely to constitute a root cause for the detected anomaly. At p smaller than 3, there is a concern that an RC which could constitute a root cause for the detected anomaly may be omitted from the anomaly detection report. In some situations, not all p top probable RCs are identifiable. For example, if besides the highest and second highest count differences of 20 and 18 for the second and third RCs as described above, the remaining RCs in the first RC list 502 have the same or about the same count differences, then only two top probable RCs are identified. Sometimes, only one top probable RC is identifiable. The fewer top probable RCs being identified, the higher the likelihood that the identified top probable RC is an actual root cause of the detected anomaly.

At operation 520, the top probable RCs identified at operation 518 are output to be included in report part B with the corresponding first counts and in association with the current data point being found anomalous. For example, the second RC, as an identified top probable RC, is included in report part B with the corresponding first count of 50, and the third RC, as another identified top probable RC, is also included in report part B with the corresponding first count of 40. The top probable RCs included in the anomaly detection report may not necessarily be the actual root cause for the detected anomaly. However, they provide good, and most of the times, correct suggestions of where the actual root causes may be found, thereby significantly reducing the workload of the domain expert or network engineer in locating and/or trouble shooting the detected anomaly.

Figure 6:
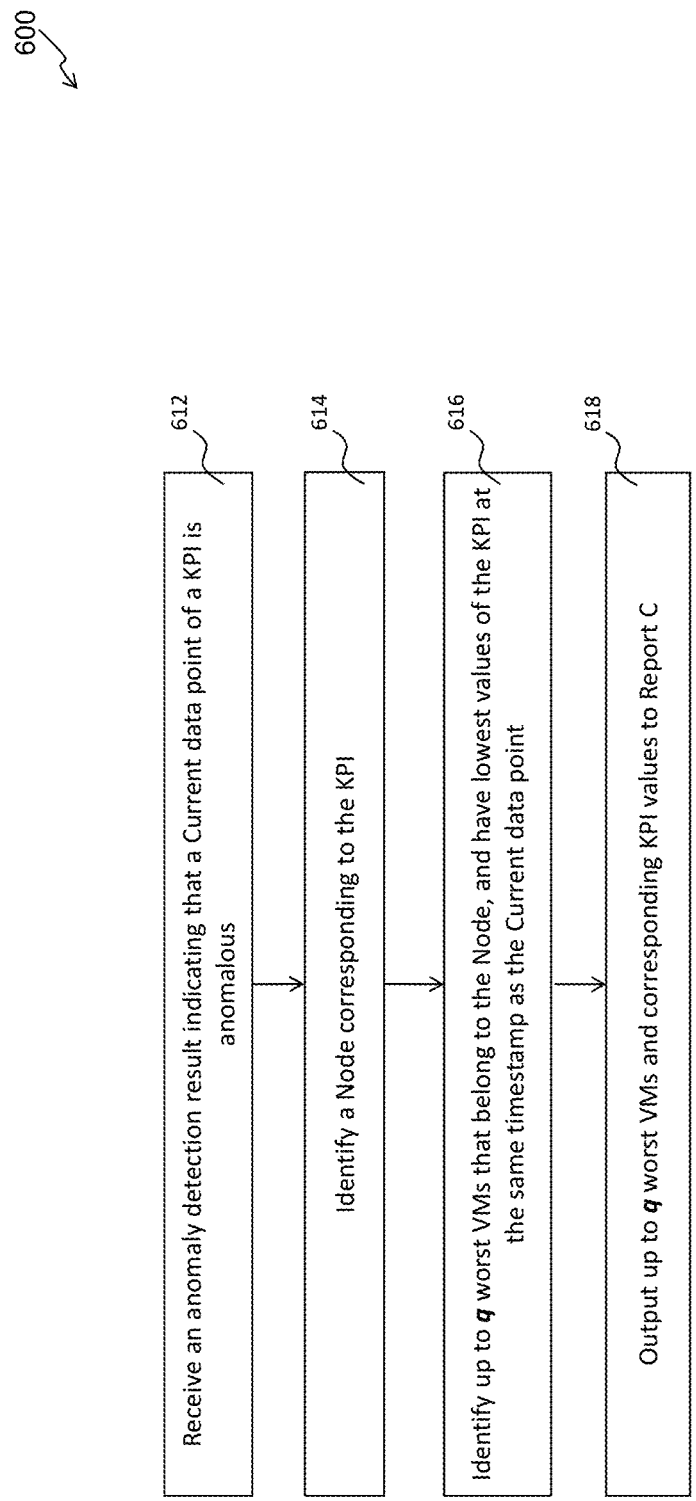
FIG. 6 is a flow chart of a probable Virtual Machine (VM) detecting process, in accordance with some embodiments.

FIG. 6 is a flow chart of a probable Virtual Machine (VM) detecting process 600, in accordance with some embodiments. In some embodiments, the process 600 corresponds to operation 356 and/or is executed in the RCA and VM report module 253 and/or by the anomaly detecting device 150. The process 600 is an example of operation 356 being executed in sequence to operation 352, as described with respect to FIG. 3. A process similar to the process 600 and is directed to operation 356 being executed independently of operation 352 is within the scopes of various embodiments. The process 600 includes operations 612-618.

At operation 612, an anomaly detection result indicating that a current data point of a KPI is anomalous is received, e.g., as described at 357 in FIG. 3. For example, the current data point having the KPI value KPI 1,1 is identified as anomalous.

At operation 614, in response to the anomaly detection result received at operation 612, the node corresponding to the KPI having the anomalous current data point is identified. In at least one embodiment, the node is identified from the KPI ID, as described herein.

At operation 616, among VMs executed on, by or for the identified node, those corresponding to the KPI are identified. The values of the KPI reported for the identified VMs during a time period corresponding to the timestamp of the anomalous data point are retrieved. In some embodiments, these KPI values correspond to the VM KPI data set 348 described with respect to FIG. 3. Up to q lowest KPI values among the retrieved KPI values of the identified VMs are identified.

For example, when the current data point having the KPI value KPI 1,1 is identified as anomalous, four VMs, i.e., VM1, VM2, VM3, VM4 are identified as corresponding to the node and the KPI. The KPI values, e.g., VM1 KPI, VM2 KPI, VM3 KPI, VM4 KPI, reported correspondingly for VM1, VM2, VM3, VM4 during the time period corresponding to the timestamp (Day 1, Time 1) of the anomalous data point KPI 1,1 are identified. Assuming that VM1 KPI has the lowest value, VM1 is identified as a worst VM. Assuming that VM2 KPI has the second lowest value, VM2 is also identified as a worst VM. The process is repeated to identify, if possible, q worst VMs. In some embodiments, as described herein, q=3. A reason for selecting q=3 is that at q greater than 3, the anomaly detection report becomes too crowded and may include VMs which are less likely to constitute a root cause for the detected anomaly. At q smaller than 3, there is a concern that a VM which could constitute a root cause for the detected anomaly may be omitted from the anomaly detection report. In some situations, not all q worst VMs are identifiable. For example, if besides the lowest and second lowest VM1 KPI and VM2 KPI of VM1 and VM2, the remaining VMs have the same or about the same KPI values during the time period corresponding he timestamp (Day 1, Time 1) of the anomalous data point KPI 1,1, then only two worst VMs are identified. Sometimes, only one worst VM is identifiable. The fewer worst VM being identified, the higher the likelihood that the identified worst VM is an actual root cause of the detected anomaly.

At operation 618, the worst VMs identified at operation 616 are output to be included in report part C with the corresponding KPI values of the worst VMs. In the above example, VM1 and VM2, as worst VMs, are included in report part C with the corresponding KPI values VM1 KPI and VM2 KPI. The worst VMs included in the anomaly detection report may not necessarily be the actual root cause for the detected anomaly. However, they provide good, and most of the times, correct suggestions of where the actual root causes may be found, thereby significantly reducing the workload of the domain expert or network engineer in locating and/or trouble shooting the detected anomaly.

FIG. 7 is a table showing an example anomaly detection report 700, in accordance with some embodiments. In some embodiments, the anomaly detection report 700 corresponds to the anomaly detection report 360 described with respect to FIG. 3, and/or includes one or more of report parts A, B and C as described with respect to FIGS. 4A-6.

The anomaly detection report 700 comprises a plurality of columns 701-706, 711-716, and 721-722, and rows 731-738. Each row corresponds to a detected anomaly, i.e., an anomalous data point. For each row or anomalous data point, columns 701-706 include data of report part A, columns 711-716 include data of report part B, and columns 721-722 include data of report part C, as described herein.

For example, for report part A of the detected anomaly 731, the timestamp in the column 701 includes the day of 2021-05-30, and the time of 03:00:00, the POD is indicated in column 702 as "TOTSUKA POD2," the node is indicated in column 703 as "RCS_Core" the KPI is indicated in column 704 as "11202-IMC_BREAKOUT_CSSR," the anomalous KPI value is indicated in column 705 as "87.47," and the KPI reference value is indicated in column 706 as "96.69." The anomalous KPI value "87.47" is retrieved from the database, and the KPI reference value "96.69" is calculated from past non-anomalous KPI values having the same time as described with respect to FIG. 4B. The KPI reference value "96.69" provides the domain expert or network engineer with an estimate of a normal KPI value before the anomaly occurred. A comparison of the anomalous KPI value "87.47" and the KPI reference value "96.69" provides the domain expert or network engineer with an estimate of how "off" the detected anomaly is from the normal behavior.

For report part B of the detected anomaly 731, two RCAs corresponding to the detected anomaly are identified. As indicated in column 711, the first RCA is "11516-C10A802_CSVPG_SCSCF_SIP_RCV_INV_403". As indicated in column 712, the first RCA occurred 14 times, in an RC list associated with the anomalous data point. An example of such an RC list is described in detail with respect to FIG. 5A. As indicated in columns 713 and 714, the second RCA is "11570-C10A802_CSVPG_SCSCF_SIP_RCV_INV_504" which occurred 7 times in the same RC list. Although up to three top probable RCAs (p=3) can be included in the anomaly detection report 700, the third RCA is not identifiable in this example, and columns 715, 716 for the detected anomaly 731 are left blank. The identified first and second RCAs may not be necessarily the actual root causes for the detected anomaly 731, but they provide good suggestions of where the actual root causes may be found, thereby significantly reducing the workload of the domain expert or network engineer in locating and/or trouble shooting the detected anomaly. The identified counts "14" and "7" correspondingly for the first and second RCAs also suggest to the domain expert or network engineer that the first RCA with the significantly higher count of "14" may be likely the actual root cause, and may be worth investigating first.

For report part C of the detected anomaly 731, three worst VMs corresponding to the detected anomaly are identified. The worst VMs are identified in column 721 as "uhn3ttr2rcsc0101," "uhn3ttr2rcsc0102," and "uhn3ttr2rcsc010." The corresponding KPI values reported from the worst VMs are identified in column 722 as "72.46," "89.19," and "93.24." By comparing the worst VMs' KPI values with the KPI reference value "96.69" at column 706, the domain expert or network engineer may quickly estimate how far each of the VMs deviates from the normal behavior.

In the specific example in FIG. 7, three anomalies 731, 732, 733 were detected for the same KPI "11202-IMC_BREAKOUT_CSSR" at the same node and the same POD, on the same day "2021-05-30," but at different times "03:00:00," "02:00:00" and "01:00:00." In some embodiments, these three anomalies 731, 732, 733 were detected by three different executions of an anomaly detection process based on three different sets of historical data, as described with respect to one or more of FIGS. 4A and 4C. The KPI reference values "96.69," "96.35," "96.16," corresponding to the three anomalies 731, 732, 733 are different, because they are calculated based on three different sets of historical data, as described with respect to FIG. 4B. The same RC "11516-C10A802_CSVPG_SCSCF_SIP_RCV_INV_403"

was identified as a top probable RCA for all three anomalies 731, 732, 733. This strongly suggests to the domain expert or network engineer that the RC "11516-C10A802_CSVPG_SCSCF_SIP_RCV_INV_403" is the actual root cause. The same VM "uhn3ttr2rcsc0101" was identified as a worst VM corresponding to all three anomalies 731, 732, 733. This strongly suggests to the domain expert or network engineer that the VM "uhn3ttr2rcsc0101" is the actual reason for the anomalies that persist for about 3 hours at the same pod and node.

In some embodiments, the anomaly detection report 700 gives the domain expert or network engineer in charge an easy way to visualize where (e.g., the pod and node) anomalies are observed, and the probable causes (e.g., RCAs and VMs) for such anomalies. As a result, the domain expert or network engineer in charge can timely take corrective action as necessary.

Some embodiments as described herein provide a time and computation-efficient way to process a large amount of data, e.g., KPI data, coming from all over a communications network, e.g., a few thousand KPIs in some situations. Some embodiments provide an easy-to-understand report of the detected anomalies and their probable causes (i.e., RCAs and/or VMs as described with respect to the report 700), with sufficient accuracy while saving time and labor for reviewing the large amount of KPI data.

For example, KPI data are collected from various pods and nodes every hour, and stored in a database. One or more machine learning algorithms are repeatedly executed per KPI, per hour, based on rolling sets of KPI data to detect anomalies and report the information related to the detected anomalies, as described with respect to report parts A, B and C. In at least one embodiment, unsupervised machine learning algorithms are used, thereby saving training time while still achieving quick and accurate anomaly detection results. In at least one embodiment, the sensitivity of anomaly detection is selectable and/or adjustable, as described with respect to coefficient "k" herein. In some embodiments, despite the repeated re-execution of the anomaly detection process for each KPI, it is still possible to perform anomaly detection for all KPIs (sometimes, several thousand KPIs) considered for anomaly detection in the communications network within an hour, so that when the next hour comes, the whole process is again performed individually per KPI for all KPIs. As a results, real-time or near real-time network monitoring and/or trouble shooting is achievable.

In at least one embodiment, the anomaly detection report is updated as newly detected anomaly is reported. The anomaly detection report is easy-to-understand and can assist the domain expert or network engineer in charge to make timely decisions in one or more of performance optimization, outage prevention, trouble shooting, network planning, or the like. In at least one embodiment, the ability to automatically receive periodically reported (e.g., hourly) KPI data from all over the communications network, and quickly and efficiently generate a concise report of a much lower number (e.g., a few dozen or hundred) of anomalies and their probable root causes (e.g., RCAs and/or VMs) is a significant advantage. This is especially true in the area of telecommunications, where multiple KPIs that are required to monitor and/or to identify the quality (performance) of various cells/sites/equipment over the communications network. Each hour the generated data for these KPIs are huge, which makes the manual analysis almost impossible to perform. Further, it is desirable to identify the root cause of the anomaly, because an anomalous behavior, if not addressed timely, could indicate a possible failure that can lead to network degradation, huge maintenance cost, and bad user experience. Some embodiments as described herein address all of these concerns.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure. In some embodiments, one or more of the described methods are automatically performed, either entirely or at least partly.

Figure 8:
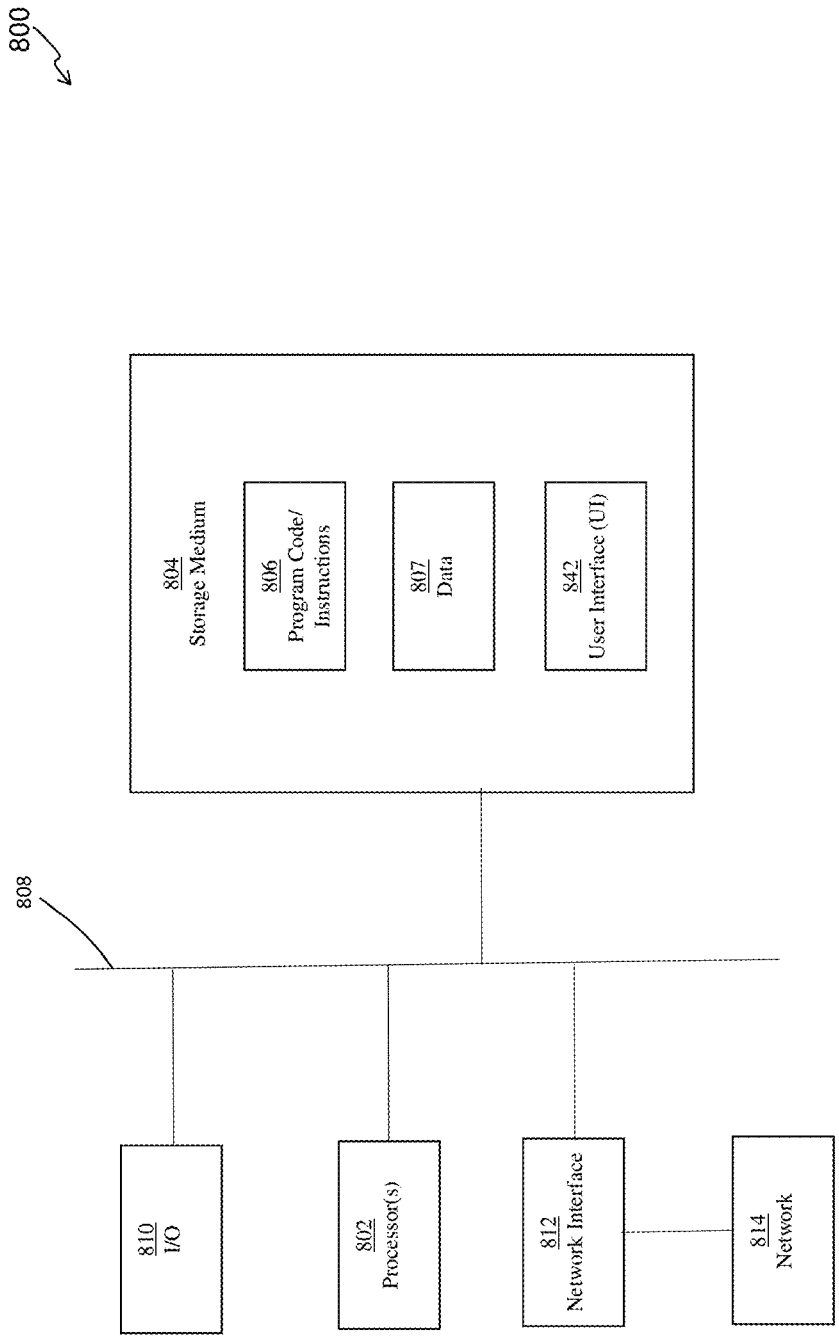
FIG. 8 is a schematic block diagram of a computer system, in accordance with some embodiments.

FIG. 8 is a schematic block diagram of a computer system 800 in accordance with some embodiments. In one or more embodiments, the computer system 800 is an example configuration of one or more base stations, network devices, database 140 and anomaly detecting device 150 as described herein.

The computer system 800 includes a hardware processor 802 and a non-transitory, computer-readable storage medium 804. Storage medium 804, amongst other things, is encoded with, i.e., stores, computer program code 806, i.e., a set of executable instructions, such as one or more algorithms and/or machine learning models used in one or more methods described with respect to one or more of FIGS. 2-8. Execution of instructions 806 by hardware processor 802 implements a portion or all of the methods described herein in accordance with one or more embodiments (hereinafter, the noted processes and/or methods).

Processor 802 is electrically coupled to computer-readable storage medium 804 via a bus 808. Processor 802 is also electrically coupled to an I/O interface 810 by bus 808. A network interface 812 is electrically connected to processor 802 via bus 808. Network interface 812 is connected to a network 814, so that processor 802 and computer-readable storage medium 804 are connectable to external elements or devices via network 814. Processor 802 is configured to execute computer program code 806 encoded in computer-readable storage medium 804 in order to cause computer system 800 to be usable for performing a portion or all of the noted processes and/or methods. In one or more embodiments, processor 802 comprises a central processing unit (CPU), a multi-processor, a distributed processing system, an application specific integrated circuit (ASIC), and/or a suitable processing unit.

In one or more embodiments, computer-readable storage medium 804 comprises an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause computer system 800 to be usable for performing a portion or all of the noted processes and/or methods. In one or more embodiments, storage medium 804 also stores information or data 807, such as training data and/or data for cell anomaly detection used in a portion or all of the noted processes and/or methods.

I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802. Computer system 800 is configured to receive information through I/O interface 810. The information received through I/O interface 810 includes one or more of instructions, data, machine learning models, and/or other parameters for processing by processor 802. The information is transferred to processor 802 via bus 808. Computer system 800 is configured to receive information related to a user interface through I/O interface 810. The information is stored in computer-readable storage medium 804 as user interface (UI) 842.

Network interface 812 allows computer system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more computer system 800.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

In some embodiments, a method performed by at least one processor comprises, for each feature among a plurality of features of a communications network, performing an anomaly detection process. The anomaly detection process comprises selecting, from a plurality of historical data points of the feature, a set of historical data points. The anomaly detection process further comprises determining, using a machine learning module, a set of scores, each score in the set of scores corresponding to one historical data point in the set of historical data points. The anomaly detection process further comprises determining an anomaly threshold based on the set of scores, and comparing the anomaly threshold with a score corresponding to a current data point of the feature to determine whether the current data point is anomalous or not. The anomaly detection process further comprises, in response to a determination that the current data point is anomalous, identifying the feature as an anomalous feature, and including the anomalous feature and the current data point in an anomaly detection report.

In some embodiments, for a communications network comprising one or more sections each comprising a plurality of nodes, each node among the plurality of nodes having one or more executed virtual machines (VMs), an anomaly detecting device comprises at least one processor configured to, for each key performance indicator (KPI) among a plurality of KPIs of each node among the plurality of nodes of the one or more sections of the communications network, execute an anomaly detection process. The anomaly detection process comprises determining an anomaly threshold of the KPI based on a first set of historical data points of the KPI; determining whether a current data point of the KPI is anomalous or not, based on the anomaly threshold; retrieving a first list of release causes (RCs) corresponding to the current data point; identifying at least one top RC in the first list, based on a comparison of the first list and a second list of RCs corresponding to a historical data point among the historical data points of the KPI; identifying, among the plurality of nodes, a node corresponding to the KPI; identifying, among the one or more executed VMs of the identified node, at least one worst VM having a lowest value of the KPI in a time period corresponding to the current data point; and in response to a determination that the current data point is anomalous, identifying the KPI as an anomalous KPI and including, in an anomaly detection report, at least one of the anomalous KPI, the at least one top RC corresponding to the anomalous KPI, or the at least one worst VM corresponding to the anomalous KPI.

In some embodiments, a non-transitory computer-readable medium including instructions that are executable by a computer to cause the computer to perform operations comprising, for each key performance indicator (KPI) among a plurality of KPIs of a plurality of nodes in one or more sections of a communications network, selecting, from a plurality of historical data points of the KPI, a first set of historical data points; determining a first anomaly threshold of the KPI based on the first set of historical data points; determining whether a first current data point of the KPI is anomalous or not based on the first anomaly threshold; selecting, from the plurality of historical data points of the KPI, a second set of historical data points, wherein the second set has the same number of historical data points as the first set and is shifted in time relative to the first set; determining a second anomaly threshold of the KPI based on the second set of historical data points; and determining whether a second current data point of the KPI is anomalous or not based on the second anomaly threshold. In response to a determination that at least one of the first current data point or the second current data point is anomalous, the KPI is identified as an anomalous KPI, and the anomalous KPI and the at least one of the first current data point or the second current data point are included in an anomaly detection report.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method performed by at least one processor, and comprising:
   for each feature among a plurality of features of a communications network, performing an anomaly detection process comprising:
     determining an anomaly threshold of the feature, based on a plurality of historical data points of the feature, determining whether a current data point of the feature is anomalous or not, based on the anomaly threshold, in response to a determination that the current data point is anomalous, identifying the feature as an anomalous feature, including the anomalous feature and the current data point in an anomaly detection report, retrieving a first list of release causes (RCs) corresponding to the current data point, retrieving a second list of RCs corresponding to a historical data point among the plurality of historical data points of the feature, for each RC in the first list, determining a count difference between (i) a first count of occurrences of the RC in the first list and (ii) a second count of occurrences of the RC in the second list, identifying at least one top RC in the first list having a highest count difference, and including, in the anomaly detection report,
the at least one top RC, and
the corresponding first count of the at least one top RC in the first list of RCs.

2. The method of claim 1, wherein
the historical data point, for which the second list of RCs is retrieved, precedes the current data point by a predetermined time interval.

3. A method performed by at least one processor, and comprising:

for each feature among a plurality of features of a communications network, wherein the communications network comprises a plurality of nodes, and each node among the plurality of nodes has one or more executed virtual machines (VMs), performing an anomaly detection process comprising:

determining an anomaly threshold of the feature, based on a plurality of historical data points of the feature, determining whether a current data point of the feature is anomalous or not, based on the anomaly threshold, in response to a determination that the current data point is anomalous, identifying the feature as an anomalous feature, including the anomalous feature and the current data point in an anomaly detection report, identifying, among the plurality of nodes, a node corresponding to the feature, identifying, among the one or more executed VMs of the identified node, at least one worst VM having a lowest value of the feature in a time period corresponding to the current data point, and including, in the anomaly detection report,
the at least one worst VM, and
the corresponding lowest value of the feature.

4. A method performed by at least one processor, and comprising:

for each feature among a plurality of features of a communications network, performing an anomaly detection process comprising:

selecting, from a plurality of historical data points of the feature, a set of historical data points, calculating, using a machine learning module, a set of scores, wherein each score in the set of scores is in one-to-one correspondence with one historical data point in the set of historical data points, determining an anomaly threshold based on the set of scores, comparing the anomaly threshold with a score corresponding to a current data point of the feature to determine whether the current data point is anomalous or not, and in response to a determination that the current data point is anomalous, identifying the feature as an anomalous feature, and including the anomalous feature and the current data point in an anomaly detection report, wherein said determining the anomaly threshold based on the set of scores comprises:

comparing a maximum score in the set of scores with a predetermined value, in response to the maximum score lower than the predetermined value, determining the predetermined value as the anomaly threshold, and in response to the maximum score not lower than the predetermined value, calculating the anomaly threshold based on the maximum score.

5. The method of claim 4, further comprising:
repeatedly performing, at a predetermined time interval, the anomaly detection process for each feature among the plurality of features.

6. The method of claim 4, further comprising:
performing the anomaly detection process for all of the plurality of features, wherein the anomaly detection process is performed individually for each feature among the plurality of features; and including, in the anomaly detection report,
anomalous features identified by the performed anomaly detection process, and
corresponding current data points determined by the performed anomaly detection process as anomalous.

7. The method of claim 4, wherein
for each feature among the plurality of features, the anomaly detection process further comprises:
performing outlier removal on the set of scores, using a further machine learning module different from the machine learning module, to obtain a reduced set of scores,
wherein the determining the anomaly threshold is based on the reduced set of scores.

8. The method of claim 4, wherein
for each feature among the plurality of features, the anomaly detection process further comprises:
selecting, from the plurality of historical data points of the feature, a reduced set of historical data points arranged at a predetermined time interval in time, wherein the historical data points in the reduced set of historical data points were previously determined as non-anomalous,
determining a reference value of the feature based on the reduced set of historical data points, and
in response to the feature being identified as anomalous, including the reference value of the feature in the anomaly detection report.

9. The method of claim 4, wherein
the machine learning module is an Enhanced Spectral Residual (ESR) module.

10. The method of claim 4, wherein the communications network comprises one or more sections each comprising a plurality of nodes, each node among the plurality of nodes having one or more executed virtual machines (VMs), each feature among the plurality of features is a key performance indicator (KPI) among a plurality of KPIs of each node among the plurality of nodes of the one or more sections of the communications network, and the anomaly detection process further comprises, for each KPI:
  retrieving a first list of release causes (RCs) corresponding to the current data point,
  identifying at least one top RC in the first list, based on a comparison of the first list and a second list of RCs corresponding to a historical data point among the historical data points of the KPI,
  identifying, among the plurality of nodes, a node corresponding to the KPI,
  identifying, among the one or more executed VMs of the identified node, at least one worst VM having a lowest value of the KPI in a time period corresponding to the current data point, and
  in response to a determination that the current data point is anomalous, identifying the KPI as an anomalous KPI and including, in an anomaly detection report, at least one of
    the anomalous KPI,
    the at least one top RC corresponding to the anomalous KPI, or
    the at least one worst VM corresponding to the anomalous KPI.

11. The method of claim 10, further comprising:
executing the anomaly detection process N times, each for a corresponding one KPI among N KPIs of the plurality of nodes of the one or more sections of the communications network, where N is a natural number, and
including all anomalous KPIs identified by the N times of execution of the anomaly detection process, together with the corresponding top RCs and worst VMs, in the anomaly detection report.

12. The method of claim 10, further comprising, every hour daily:
executing the anomaly detection process N times, each for a corresponding one KPI among N KPIs of the plurality of nodes of the one or more sections of the communications network, where N is a natural number, and
including all anomalous KPIs identified by the N times of execution of the anomaly detection process, together with the corresponding top RCs and worst VMs, in the anomaly detection report.

13. The method of claim 10, wherein
the anomaly detection report further comprises at least one of
  a timestamp corresponding to the current data point of the anomalous KPI,
  a section, among the one or more sections of the communications network, corresponding to the anomalous KPI, or
  a node, among the plurality of nodes, corresponding to the anomalous KPI.

14. The method of claim 13, wherein
the anomaly detection report further comprises at least one of
  a value of the current data point of the anomalous KPI,
  a reference value of the anomalous KPI based on a second set of historical data points which is a subset of the first set of historical data points of the anomalous KPI,
  a count of occurrences of the at least one top RC of the anomalous KPI, or
  the lowest value of the anomalous KPI of the at least one worst VM.

15. The method of claim 14, wherein
the historical data points in the second set and the current data point have timestamps corresponding to the same time of respectively different days.

16. The method of claim 14, wherein
the historical data points in the second set and the current data point have timestamps corresponding to the same hour of respectively different days.

17. The method of claim 4, wherein
each feature among the plurality of features is a key performance indicator (KPI) among a plurality of KPIs of a plurality of nodes in one or more sections of the communications network, and
the anomaly detection process further comprises, for each KPI:
  selecting, from a plurality of historical data points of the KPI, a first set of historical data points,
  determining a first anomaly threshold of the KPI based on the first set of historical data points,
  determining whether a first current data point of the KPI is anomalous or not based on the first anomaly threshold,
  selecting, from the plurality of historical data points of the KPI, a second set of historical data points, wherein the second set has the same number of historical data points as the first set and is shifted in time relative to the first set,
  determining a second anomaly threshold of the KPI based on the second set of historical data points,
  determining whether a second current data point of the KPI is anomalous or not based on the second anomaly threshold, and
  in response to a determination that at least one of the first current data point or the second current data point is anomalous,
    identifying the KPI as an anomalous KPI, and
    including the anomalous KPI and the at least one of the first current data point or the second current data point in an anomaly detection report.

18. The method of claim 17, wherein
each of the determining the first anomaly threshold and the determining the second anomaly threshold comprises:
  determining, using a first machine learning module, a first or second set of scores, each score in the first or second set of scores corresponding to one historical data point in the first or second set of historical data points,
  performing outlier removal on the first or second set of scores, using a second machine learning module different from the first machine learning module, to obtain a reduced first or second set of scores, and
  determining the first or second anomaly threshold based on the reduced first or second set of scores.

19. The method of claim 18, wherein
the first machine learning module and the second machine learning module are unsupervised machine learning modules.

20. The method of claim 4, wherein
said calculating the anomaly threshold based on the maximum score comprises:
  multiplying the maximum score with a coefficient smaller than 1 to obtain the anomaly threshold.

* * * * *